United States Patent
Yamanaka

(10) Patent No.: US 7,701,740 B2
(45) Date of Patent: Apr. 20, 2010

(54) APPARATUS FOR THREE PHASE PWM CYCLOCONVERTER

(75) Inventor: Katsutoshi Yamanaka, Kitakyushu-shi (JP)

(73) Assignee: Kabushiki Kaisha Yaskawa Denki, Kitakyushu-shi (JP)

(*) Notice: Subject to any disclaimer, the term of this patent is extended or adjusted under 35 U.S.C. 154(b) by 85 days.

(21) Appl. No.: 11/912,543

(22) PCT Filed: Apr. 18, 2006

(86) PCT No.: PCT/JP2006/308140

§ 371 (c)(1),
(2), (4) Date: Oct. 25, 2007

(87) PCT Pub. No.: WO2006/118026

PCT Pub. Date: Nov. 9, 2006

(65) Prior Publication Data

US 2009/0091954 A1 Apr. 9, 2009

(30) Foreign Application Priority Data

Apr. 27, 2005 (JP) ............................. 2005-128915

(51) Int. Cl.
*H02M 5/00* (2006.01)
(52) U.S. Cl. ..................................................... 363/149
(58) Field of Classification Search ................. 363/149, 363/148
See application file for complete search history.

(56) References Cited

U.S. PATENT DOCUMENTS 4,847,743 A 7/1989 Kamiyama
6,771,524 B2* 8/2004 Miguchi ..................... 363/149

FOREIGN PATENT DOCUMENTS

| EP | 1 306 964 A1 | 5/2003 |
| JP | 10-337025 A | 12/1998 |
| JP | 11-341807 A | 12/1999 |

(Continued)

OTHER PUBLICATIONS

Domenico Casadei et al., "The Use of Matrix Converters in Direct Torque Control of Induction Machines", IEEE Transactions on Industrial Electronics, Dec. 2001, pp. 1057-1064, vol. 48, No. 6.

(Continued)

*Primary Examiner*—Shawn Riley
(74) *Attorney, Agent, or Firm*—Sughrue Mion, PLLC

(57) ABSTRACT

A power conversion method comprising detecting a three-phase source voltage of the three-phase AC power supply every control sampling cycle. The three-phase source voltage is allocated to a maximum voltage, an intermediate voltage and a minimum voltage as seen from a virtual neutral point voltage. A one-phase fixing switching mode is detected for fixing one of output phases into a predetermined state without switching and switching the other phases during a PWM cycle or a full phase switching mode for switching all of the phases during the PWM cycle based on an output voltage command and the three-phase source voltage. ON/OFF pattern of a bidirectional switch is determined from the switching mode thus selected, the output voltage command and the three-phase source voltage. The bidirectional switch is turned ON/OFF based on the ON/OFF pattern.

7 Claims, 12 Drawing Sheets

FOREIGN PATENT DOCUMENTS

| | | |
|---|---|---|
| JP | 2000-2724 A | 1/2000 |
| JP | 2000-139076 A | 5/2000 |
| JP | 2001-165966 A | 6/2001 |
| JP | 2003-259647 A | 9/2003 |
| JP | 2003-309975 A | 10/2003 |
| JP | 2004-180390 | 6/2004 |

OTHER PUBLICATIONS

Yukihiko Sato et al., "Trend of Direct AC/AC Converters and Related Technologies Matrix Converters (PWM Controlled Cycloconverters", Japan Industry Application Society Conference, 2004, pp. 37-40.

Kenichi Iimori et al., "Trend of Direct AC/AC Converters and Related Technologies—Direct AC-AC Converters with DC Link", Japan Industry Application Society Conference, 2004, pp. 41-44.

Korean Office Action dated Oct. 14, 2009, for U.S. Appl. No. 10-2007-7024733.

Jun-Koo Kang, et al.; "The Matrix Converter Drive Performance Under Abnormal Input Voltage Conditions"; IEEE Transactions on Power Electronics, Sep. 2002; vol. 17, No. 5; pp. 721-730.

* cited by examiner

APPARATUS FOR THREE PHASE PWM CYCLOCONVERTER

TECHNICAL FIELD

The present invention relates to a power converter capable of carrying out a power conversion into an optional frequency from an AC power supply, and more particularly to a power converter and a power conversion method which use a pulse width modulation (PWM) control and a direct torque control.

BACKGROUND ART

A matrix converter can connect each phase of an AC power supply to output phase through a circuit structure of a bidirectional switch having a self-extinction capability and can directly convert an AC power into any voltage and frequency. In order to forcibly switch a current flowing to the switch, however, it is necessary to provide a unique switching sequence. The switching sequence will be hereinafter referred to as a commutating sequence. A switching sequence of a PWM cycloconverter has been disclosed in Patent Document 1 and Patent Document 2.

Examples of a method of creating a commutating sequence include a method of creating a commutating sequence based on an interswitch voltage polarity signal obtained by using a circuit for deciding a polarity of voltage of a switching device and a method of creating a commutating sequence based on an output current direction signal obtained by an output current direction detection circuit for deciding a direction of an output current flowing from a switching device (for example, Patent Document 3 and Patent Document 4). The communicating sequence which based on a PWM signal which is output is often created in a logic circuit and it is necessary to take a certain time in consideration of a switching time of the switching device. For this reason, an error is made between a voltage command value and an output voltage which is actually output. The error is generated depending on a state of a voltage of a power supply, and a voltage polarity and a voltage in the switching device which act as an information source of the communicating sequence. When a current flows to the bidirectional switch, furthermore, a voltage drop is caused in respect of a characteristic of a semiconductor device so that an error of the output voltage is made. Patent Document 5 compensating the problem by previously correcting the error into a command and Patent Document 6 eliminates the problem by using such a communicating sequence as not to make an error. In the matrix converter, generally, a PWM pulse having one-phase switching stopped is set to reduce a switching loss (Non-Patent Document 1, FIG. 2 and Non-Patent Document 2, FIG. 8). Moreover, Non-Patent Document 3 has proposed a matrix converter using a direct torque control.

Patent Document 1: JP-A-11-341807
Patent Document 2: JP-A-2000-139076
Patent Document 3: JP-A-2000-2724
Patent Document 4: JP-A-2001-165966
Patent Document 5: JP-A-2003-309975 (FIGS. 6 and 7)
Patent Document 6: EP1306964 (FIG. 5)
Non-Patent Document 1: "Trend of Direct AC/AC Converters and Related Technologies—Matrix Converter (PWM Controlled Cycloconverters)", *Japan Industry Application Society Conference* 1-S3-2 (2004)
Non-Patent Document 2: "Trend of Direct AC/AC Converters and Related Technologies—Direct AC-AC Converters with DC Link", *Japan Industry Application Society Conference* 1-S3-3 (2004)
Non-Patent Document 3: Domenico Casadei et al.: "The Use of Matrix Converters in Direct Torque Control of Induction Machines", *IEEE TRANSACTIONS ON INDUSTRIAL ELECTRONICS*, VOL. 48, NO. 6, DECEMBER 2001

DISCLOSURE OF THE INVENTION

Problems that the Invention is to Solve

In a conventional matrix converters a PWM pulse having one-phase switching stopped is set, and furthermore, a pattern of the PWM pulse is varied depending on a state of an input power supply. FIGS. 9 and 10 show examples of a PWM pulse in which the state of the input power supply is varied. U-phase switching is stopped when the intermediate voltage $E_M$ of the input power supply is close to $E_N$ in FIG. 9 and W-phase switching is stopped when the intermediate voltage $E_M$ of the input power supply is close to $E_P$ in FIG. 10. The phases in which the switching is stopped are determined by the state of the input power supply and do not depend on an output voltage command.

The output voltage is determined by a pulse width of a PWM Output. Therefore, when a pulse width to bring a state in which a U phase is P, a V phase is N and a W phase is N is greatly reduced, for example, the PWM pulse in FIG. 9 is generated by only V-phase switching. For this reason, there is a problem in that the pulse to bring the state in which the U phase is P, the V phase is N and the W phase is N is not output by an influence of a time period required for a commutating sequence of the V phase or a delay of switching. In the PWM pulse of FIG. 10, however, the pulse width to bring the state in which the U phase is P, the V phase is N and the W phase is N is output as a difference between pulses having the U and V phases. For this reason, the problem is not caused. Referring to a pulse width to bring a state in which the U phase is P, the V phase is P and the W phase is N, the problem is caused. With such a structure as to correct a voltage drop in respect of a characteristic of a communicating sequence or a semiconductor device, furthermore, the small pulse width cannot be corrected. For this reason, there is a problem in that distortions of an output voltage and an output current cannot be corrected.

In a conventional PWM pulse pattern calculating method of the matrix converter, moreover, an input current is controlled and an output voltage is controlled, and furthermore, an output PWM pulse and an output voltage vector are determined at the same time. For this reason, there is a problem in that a connection of the input current control and the output voltage vector cannot be cut off. In a control method of virtually carrying out a separation as an AC/DC converting+DC/AC converting device and taking a consideration by separating an input current vector of the AC/DC converting device from the output voltage vector of the DC/AC converting device in respect of a control as in the Non-Patent Document 3, moreover, there is a problem in that a thinking way is complicated, and furthermore, it is impossible to take a vector state in which all of respective phases of an AC power supply of an input are separately connected to respective phases of an output. In the method, there is a problem in that a distortion of the output voltage is great.

In consideration of the problems, it is an object of the invention to provide a power converter and a power conversion method which can reduce distortions of an output voltage and an output current also in the case in which a PWM pulse is reduced.

Furthermore, it is an object of the invention to provide a power converter which uses a thinking way of a space vector, applies a thought based on an output voltage vector, caries out a calculation reliably and easily, decreases a pulse distortion of an output voltage and that of an input current, reduces a size and cuts down a cost.

Means for Solving the Problems

In order to solve the problems, the invention has the following structure.

A first aspect of the invention is directed to a power converter for connecting each phase of an AC power supply to each phase on an output side through a bidirectional switch having a self-extinction capability, and converting an AC source voltage by PWM, thereby outputting any voltage, the power converter comprising:

a one-phase fixing switching mode for fixing one of output phases into a predetermined state without switching while switching the other phases during a PWM cycle;

a full phase switching mode for switching all of the phases during the PWM cycle; and a mode switching section for switching the full phase switching mode and the one-phase fixing switching mode.

Moreover, a second aspect of the invention is directed to the power converter according to the first aspect of the invention, wherein the mode switching section switches from the one-phase fixing switching mode to the full phase switching mode when an output pulse width is equal to or smaller than a predetermined value.

A third aspect of the invention is directed to the power converter according to the first aspect of the invention, wherein the mode switching section switches from the one-phase fixing switching mode to the full phase switching mode when an output voltage phase is set within a predetermined range.

A fourth aspect of the invention is directed to the power converter according to the first aspect of the invention, wherein the mode switching section switches from the one-phase fixing switching mode to the full phase switching mode when a phase of the AC source voltage is set within a predetermined range and an output voltage phase is set within a predetermined range.

A fifth aspect of the invention is directed to the power converter according to the first aspect of the invention, wherein the mode switching section switches from the one-phase fixing switching mode to the full phase switching mode when the AC source voltage is set within a predetermined range and an output voltage phase is set within a predetermined range.

A sixth aspect of the invention is directed to the power converter according to the first aspect of the invention, wherein the mode switching section switches from the one-phase fixing switching mode to the full phase switching mode when an output voltage is set within a predetermined range.

A seventh aspect of the invention is directed to a power conversion method of connecting each phase of a three-phase AC power supply to each phase on a three-phase output side through a bidirectional switch having a self-extinction capability, and converting a voltage of the three-phase AC power supply by PWM, thereby outputting any voltage, the power conversion method comprising the steps of:

detecting a three-phase source voltage of the three-phase AC power supply every control sampling cycle;

allocating the tree-phase source voltage to a maximum voltage, an intermediate voltage and a minimum voltage as seen from a virtual neutral point voltage;

determining a one-phase fixing switching mode for fixing one of output phases into a predetermined state without switching and switching the other phases during a PWM cycle or a full phase switching mode for switching all of the phases during the PWM cycle based on an output voltage command and the three-phase source voltage;

determining an ON/OFF pattern of a bidirectional switch from the switching mode thus selected, the output voltage command and the three-phase source voltage; and turning ON/OFF the bidirectional switch based on the ON/OFF pattern.

An eighth aspect of the invention is directed to a power converter for connecting each phase of an AC power supply to each phase on an output side through a bidirectional switch having a self-extinction capability, and controlling an ON/OFF state of the switch, thereby outputting any voltage, the power converter comprising:

a vector component calculator that carries out a classification into a P phase having a maximum voltage value of the AC power supply, an M phase having an intermediate voltage value, and an N phase having a minimum voltage value based on a voltage value of each phase seen from a neutral point of the AC power supplies, and applies a voltage vector determined based on a connecting state of the phase on the output side and the AC power supply to a hexagonal space vector diagram, and selects a voltage vector equal to an instantaneous voltage vector to be output, from the hexagonal space vector diagram, and then calculates a vector component of the instantaneous voltage vector; and an output time calculator for calculating an output time of the voltage vector based on the vector component, wherein a switch of the power converter is ON/OFF controlled based on a calculation result of the time calculator.

A ninth aspect of the invention is directed to the power converter according to the eighth aspect of the invention, the vector component calculator and the output time calculator repeat a calculation every certain cycle.

A tenth aspect of the invention is directed to the power converter according to the eighth aspect of the invention, wherein when a plurality of voltage vectors having the same vector component are present, they are sequentially selected every predetermined time and an input current of the AC power supply is converted into a sine wave.

An eleventh aspect of the invention is directed to the power converter according to the eighth aspect of the invention, further comprising:

a PWM pulse pattern switching device for switching between a PWM pulse pattern which outputs a cm vector obtained by electrically connecting each phase of a three-phase AC output to the P phase, the N phase and the M phase of a three-phase AC power supply and a PWM pulse pattern which does not output the cm vector.

A twelfth aspect of the invention is directed to the power converter according to the eleventh aspect of the invention, wherein the PWM pulse pattern switching device is operated based on a phase of an input current and a phase of an output voltage.

A thirteenth aspect of the invention is directed to the power converter according to the eighth aspect of the invention, wherein only PWM pulse patterns of ap, an, bp and bn vectors for connecting each phase of a three-phase AC output to any one of the M phase, the P phase and the N phase of a three-phase AC power supply and a zero vector are used.

A fourteenth aspect of the invention is directed to the power converter according to the eighth aspect of the invention, wherein only PWM pulse patterns of ap, an, bp and bn vectors for connecting each phase of a three-phase AC output to any one of the M phase, the P phase and the N phase of a three-phase AC power supply and a zero vector are used when an output voltage is equal to or smaller than a first set value taking a value of approximately ⅓ of a line voltage maximum value of an input power supply.

ADVANTAGE OF THE INVENTION

According to the first and second aspects of the invention, there are provided the one-phase fixing switching mode for fixing one of the output phases into a predetermined state without switching and switching the other phases, and the full phase switching mode for switching all of the phases during a PWM cycle. In the case where the PWM pulse width is reduced, therefore, it is possible to eliminate the small PWM pulse width, to reduce distortions of the output voltage and the output current, and to reliably correct a voltage drop in respect of characteristics of a commutating sequence and a semiconductor device.

According to the third and fourth aspects of the invention, moreover, the switching from the one-phase fixing switching mode to the full phase switching mode is carried out based on a phase of the AC source voltage, a voltage or a phase of a voltage to be output. Therefore, it is possible to eliminate a small PWM pulse width without monitoring the PWM pulse width, to reduce distortions of an output voltage and an output current by a simple control, and to reliably correct a voltage drop in respect of the commutating sequence and the characteristic of the semiconductor device.

According to the fifth and sixth aspects of the invention, it is possible to eliminate a small PWM pulse width without monitoring the PWM pulse width based on a voltage to be output, to reduce distortions of an output voltage and an output current by a simple control, and to reliably correct a voltage drop in respect of the commutating sequence and the characteristic of the semiconductor device.

According to the seventh aspect of the invention, there are provided the one-phase fixing switching mode for fixing one of the output phases into a predetermined state without switching and switching the other phases, and the full phase switching mode for switching all of the phases during a PWM cycle. In the case where the PWM pulse width is reduced, therefore, the switch from the one-phase fixing switching mode to the full phase switching mode is carried out. Consequently, it is possible to provide a power conversion method that can eliminate the small PWM pulse width, can reduce distortions of the output voltage and the output current, and can reliably correct a voltage drop in respect of a commutating sequence and a characteristic of a semiconductor device.

According to the eighth aspect of the invention, the space vector is utilized to carry out a calculation processing. Therefore, it is possible to easily execute a processing of calculating an output voltage.

According to the ninth aspect of the invention, the distortion of the output voltage is decreased by the PWM control.

According to the tenth aspect of the invention, the input current is controlled by the vector selection and regulation. Consequently, it is possible to easily execute a processing of calculating an input current control.

According to the eleventh aspect, it is possible to switch the distortions of the input current and the output voltage by changing the PWM pulse pattern to be output.

According to the twelfth aspect of the invention, the PWM pulse pattern to be output is changed during an operation. Consequently, it is possible to regulate the distortions of the input current and the output voltage during the operation.

According to the thirteenth aspect of the invention, it is possible to reliably output a low output voltage and to reduce the distortions of the input current and the output voltage.

According to the present invention, moreover, the calculation can be carried out reliably and easily. Therefore, it is possible to carry out a control by an inexpensive apparatus. Thus, it is possible to enhance a performances to cut down a cost and to reduce a size of the power converter.

| EXPLANATION OF THE DESIGNATIONS | |
|---|---|
| 1 | system power supply |
| 2 | power circuit |
| 3 | loading device |
| 4 | control circuit |
| 5 | mode switching circuit |
| 11 | control circuit |
| 12 | PWM pulse pattern switching device |
| 13 | vector component calculator |

-continued

| | EXPLANATION OF THE DESIGNATIONS |
|---|---|
| 14 | output time calculator |
| 15 | PWM pulse pattern calculator |
| 16 | drive circuit |
| SUR | bidirectional switch connected to U phase and R phase |
| SUS | bidirectional switch connected to U phase and S phase |
| SUT | bidirectional switch connected to U phase and T phase |
| SVR | bidirectional switch connected to V phase and R phase |
| SVS | bidirectional switch connected to V phase and S phase |
| SVT | bidirectional switch connected to V phase and T phase |
| SWR | bidirectional switch connected to W phase and R phase |
| SWS | bidirectional switch connected to W phase and S phase |
| SWT | bidirectional switch connected to W phase and T phase |
| EN | virtual neutral point voltage |

BEST MODE FOR CARRYING OUT THE INVENTION

Embodiments according to the present invention will be described below with reference to the drawings.

First Example

Figure 1:
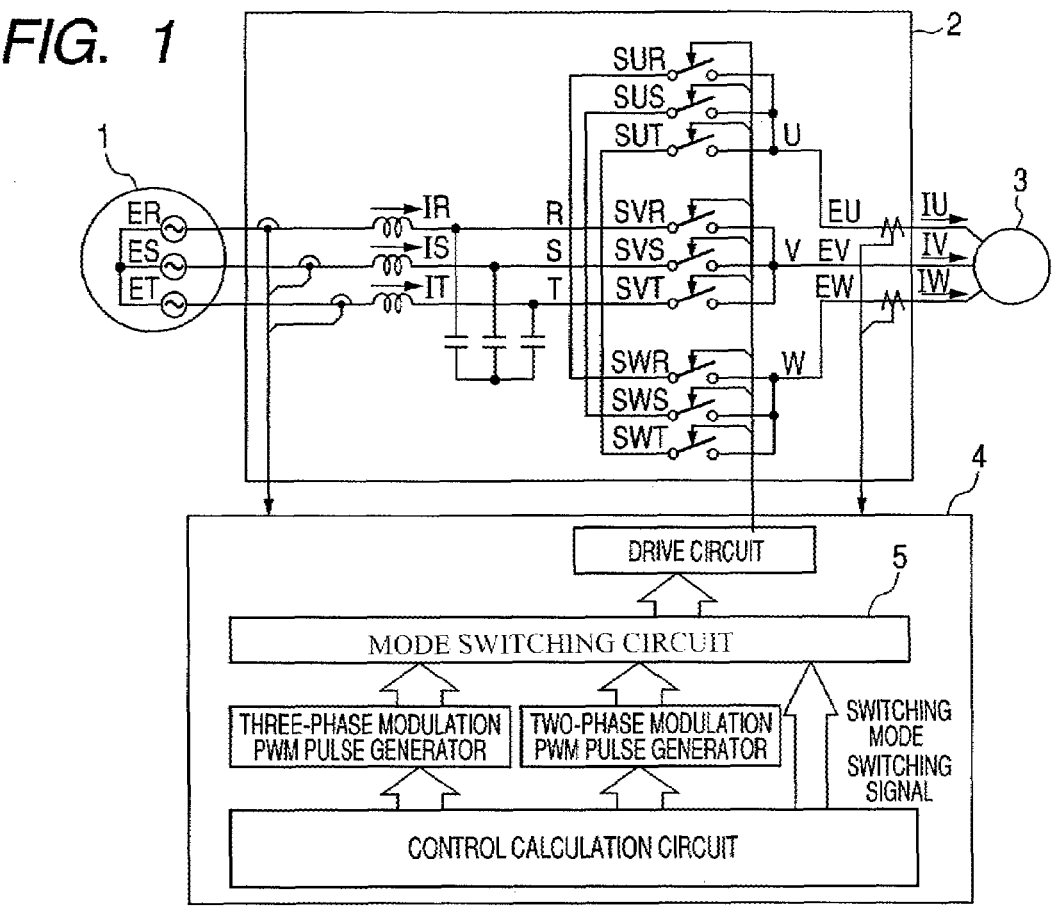
FIG. 1 is a block diagram showing a power converter according to a first example of the present invention.

FIG. 1 is a diagram showing an example of a structure of a power converter according to the present invention. In the drawing, 1 denotes a three-phase power supply, 2 denotes a main circuit of a direct power converter, 3 denotes a load (a motor), and 4 denotes a control circuit of a direct power converting circuit.

Figure 6:
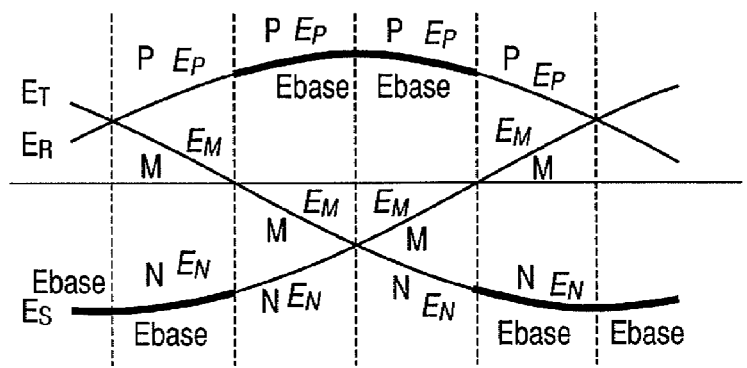
FIG. 6 is a diagram showing a correspondence of a state of an input power supply to a code of a space vector diagram.
Figure 7:
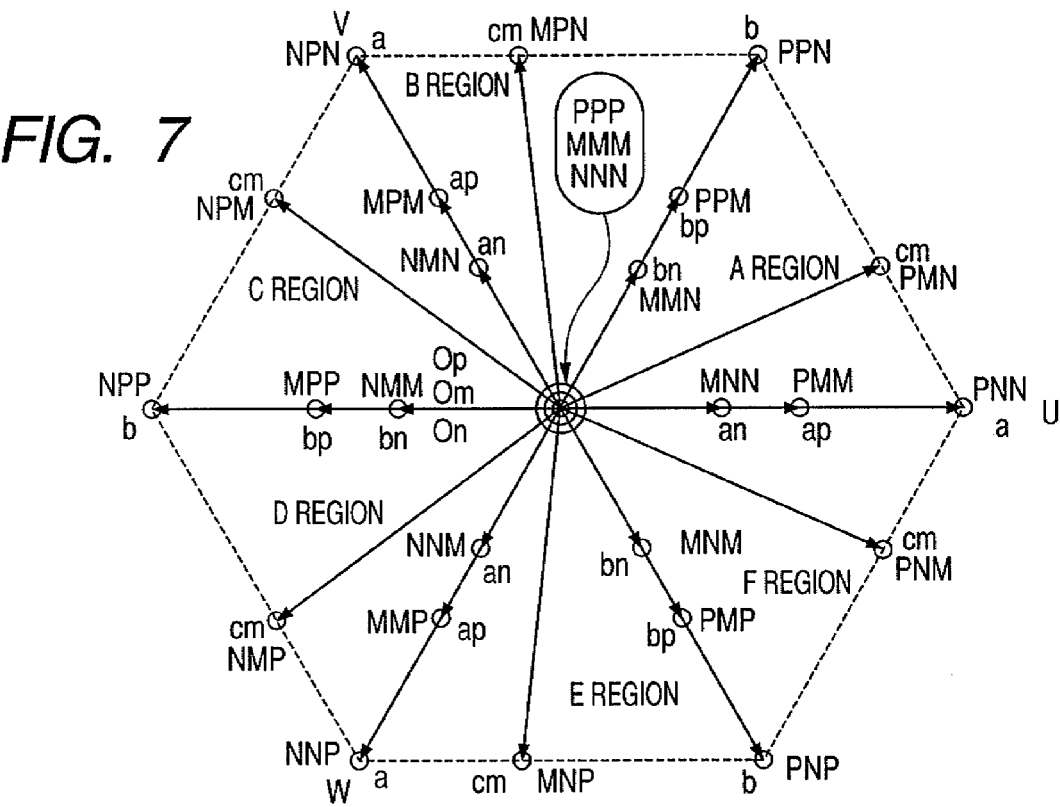
FIG. 7 is a space vector diagram.
Figure 8:
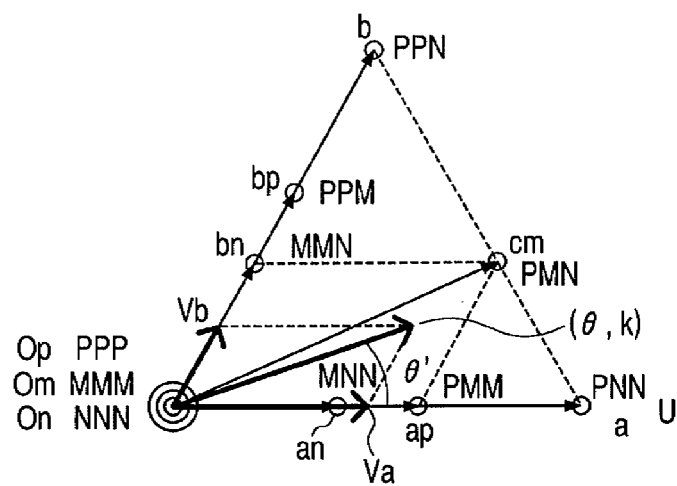
FIG. 8 is a diagram showing a correspondence of an output voltage command to a space vector.
Figure 9:
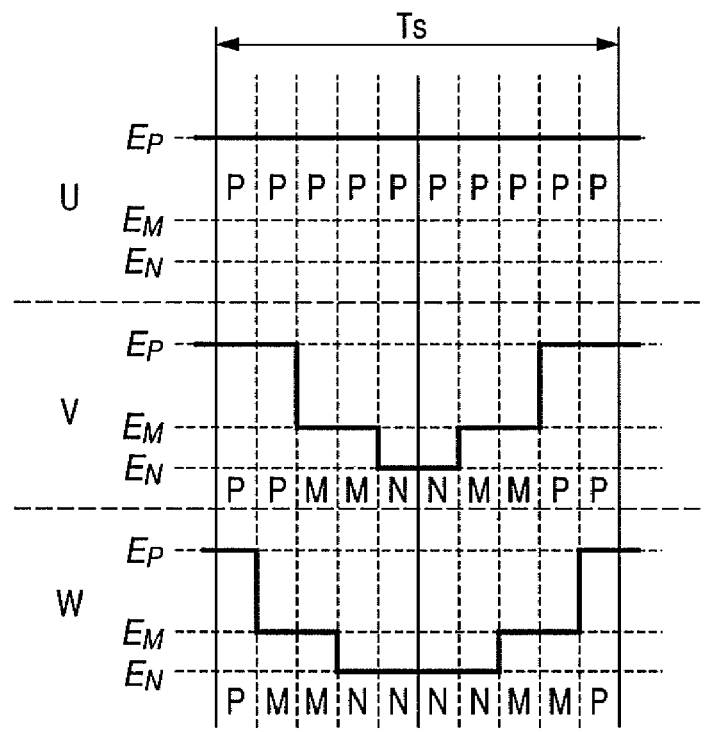
FIG. 9 is a diagram showing a PWM pulse Example 1 of a conventional two-phase modulation.
Figure 10:
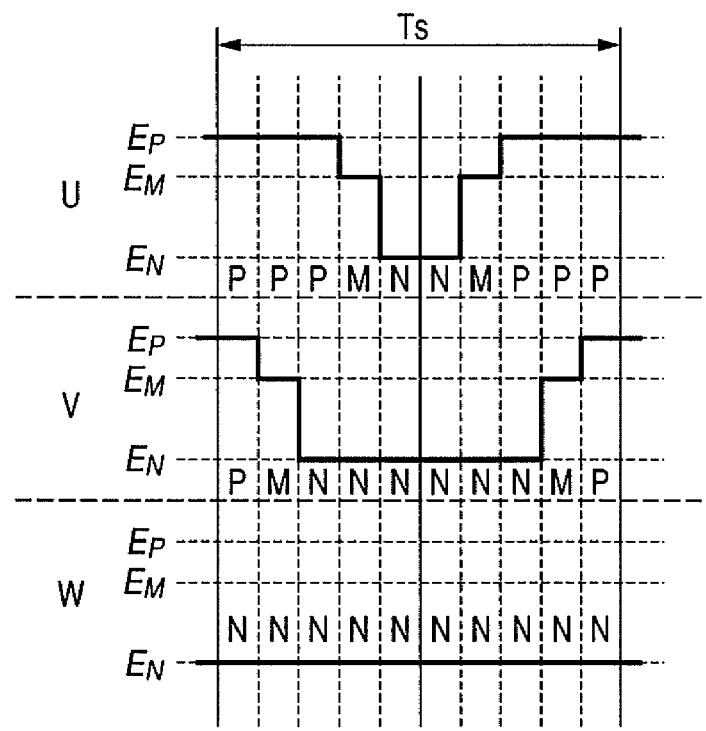
FIG. 10 is a diagram showing a PWM pulse Example 2 of the conventional two-phase modulation.
Figure 12:
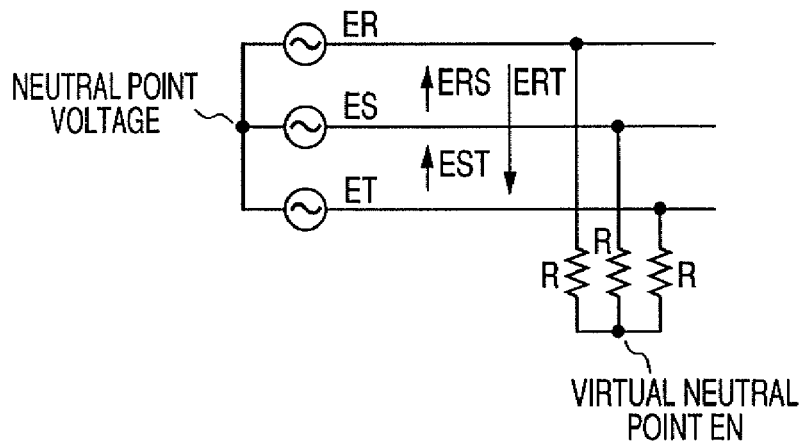
FIG. 12 is a diagram for explaining a virtual neutral point.

Referring to a three-phase source voltage and a phase, a maximum voltage phase, a minimum voltage phase and an intermediate voltage phase seen from a neutral point are allocated as P, N and M respectively as shown in FIG. 6, and a concept of a space vector is utilized so that an output voltage space vector of a direct power converting circuit can be written as in an example of FIG. 7. In the power converter, usually, a neutral point voltage cannot be directly observed. Therefore, resistances having a value equal to each other are connected like a star in each of phases of a three-phase power supply as shown in FIG. 12, a node voltage is used as a virtual neutral point voltage, and a phase voltage is obtained from a line voltage by an equation (for example, an R-phase voltage ER can be calculated as ER=(ERS−ETR)/3 by using a line voltage ERS of an R phase and an S phase and a line voltage ETR of a T phase and the R phase). In FIG. 7, lengths of voltage vectors classified as a, ap, an, b, bp and bn are varied depending on a voltage state of an input power supply, and a length and an angle of the voltage vector classified as cm are varied depending on the voltage state of the input power supply. In the case in which a voltage command output from the power converter has a voltage vector of (θ, k), a vector component $V_a$ and a b vector component $V_b$ of an output voltage command are output in a PWM (pulse width modulation) by a combination of vectors classified as a, ap, an, b, bp, bn, cm and Op, Om and On as shown in FIG. 8. In general, a two-phase modulation having one phase stopped shown in FIGS. 9 and 10 is set as a PWM pulse pattern.

As shown in FIG. 8, a PWM pulse width is output corresponding to the a vector component $V_a$ or the b vector component $V_b$ of the output voltage command. Therefore, a PWM pulse corresponding to the b vector component Vb is narrowed if the output voltage command is in the vicinity of an angle of the a vector, and a PWM pulse corresponding to the a vector component Va is narrowed if the output voltage command is in the vicinity of an angle of the b vector. If an output voltage command is low, moreover, both of the PWM pulses corresponding to the a vector component Va and the b vector component Vb are reduced. A PWM pulse width to be actually output depends on whether Op or On is utilized according to a state of an input power supply, and is changed as shown in FIG. 9 if a maximum value of a phase voltage absolute value of the input power supply is positive, and is changed as shown in FIG. 10 if the maximum value is negative, and a PWS pulse representing the b vector component has a pulse width extended by Op if Op is utilized as shown in FIG. 9 so that there is no problem. When the PWM pulse of the vector component is narrowed, however, there is a problem. If On is utilized as shown in FIG. 10, moreover, the PWM pulse utilizing the a vector component has a pulse width extended by On so that there is no problem. If the PWM pulse of the b vector component is narrowed, there is a problem.

There is provided a switching mode switching section for switching a one-phase fixing switching mode for fixing one of output phases into a predetermined state without switching and switching the other phases during a PWM cycle (which will be referred to as a two-phase modulation PWM in the case of a three-phase output) and a full phase switching mode for switching all of the phases during the PWM cycle (which will be referred to as a three-phase modulation PWM). In other words, the structure shown in FIG. 1 is employed, and a PWM pulse width of each vector calculated in a control calculation circuit is transferred to a three-phase modulation PWM pulse generator and a two-phase modulation PWM pulse generator, and outputs of the respective PWM pulse generators are selected by a switching mode switching circuit in response to a switching signal sent from the control calculation circuit. The control calculation circuit switches from the one-phase fixing switching mode for fixing one of the output phases into a predetermined state without switching and switching the other phases during the PWM cycle to the full phase switching mode for switching all of the phases during the PWM cycle to maintain the PWM pulse width when the PWM pulse width of the a vector component is smaller than a preset value in the example of FIG. 9, and switches from a two-phase modulation for stopping one-phase switching to the full phase switching mode shown in an example of FIG. 3 to maintain the PWM pulse width when the PWM pulse width of the b vector component is smaller than a preset value in the example of FIG. 10. Since the preset value depends on an operating state of the matrix converter, a commutating sequence method and a characteristic of a switching device, it is set corresponding thereto.

If the PWM pulse width is maintained, thus, there is no possibility that the PWM pulse might not be output by the influence of a time period required for the commutating sequence and a switching delay. Consequently, a distortion of an output voltage is decreased and that of an output current is also decreased. Furthermore, it is also possible to correct a voltage drop in respect of the commutating sequence and the characteristic of the semiconductor device because the PWM pulse width is maintained, and the distortions of the output voltage and the output current are further decreased. Since the switch of the PWM pulse is executed by a control calculation circuit for carrying out a correction, it is possible to perform the correction corresponding to the switch.

Figure 2:
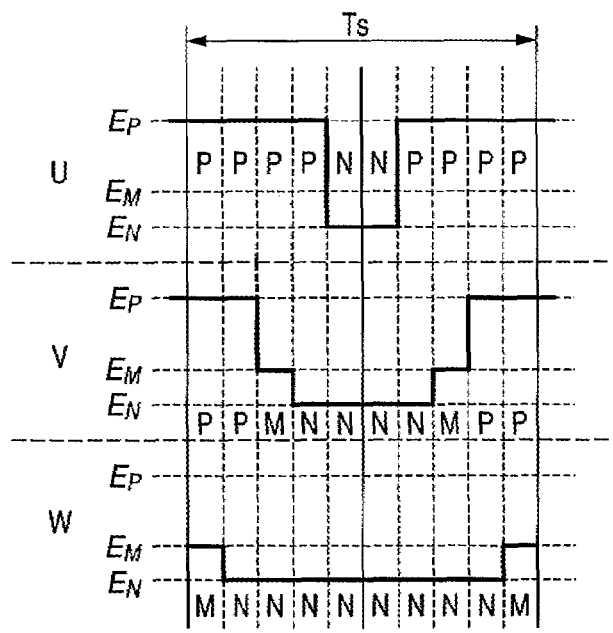
FIG. 2 is a diagram showing an example of switching a PWM pulse pattern of the power converter according to the present invention.
Figure 3:
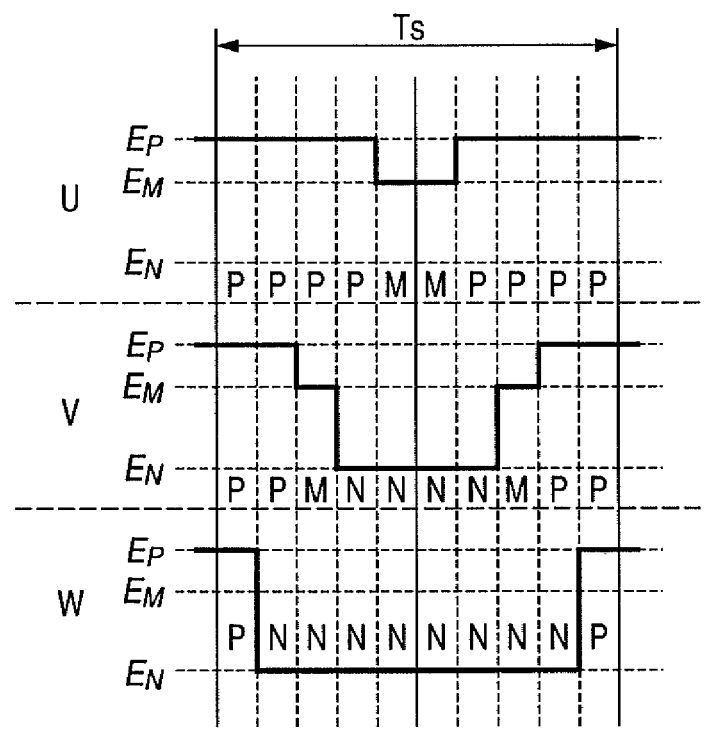
FIG. 3 is a diagram showing an example of switching the PWM pulse pattern of the power converter according to the present invention.
Figure 5:
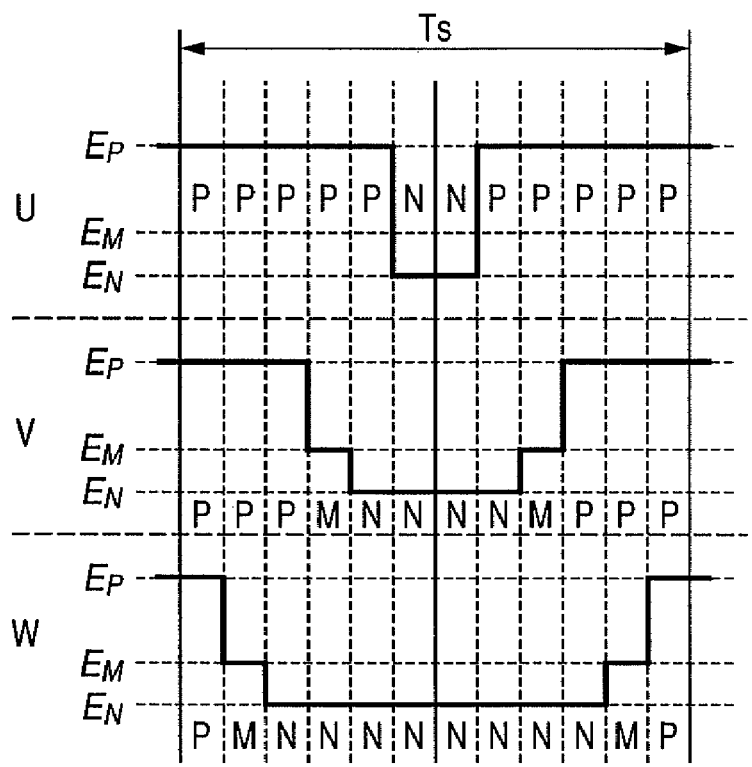
FIG. 5 is a diagram showing an example of switching the PWM pulse pattern of the power converter according to the present invention.
Figure 5:
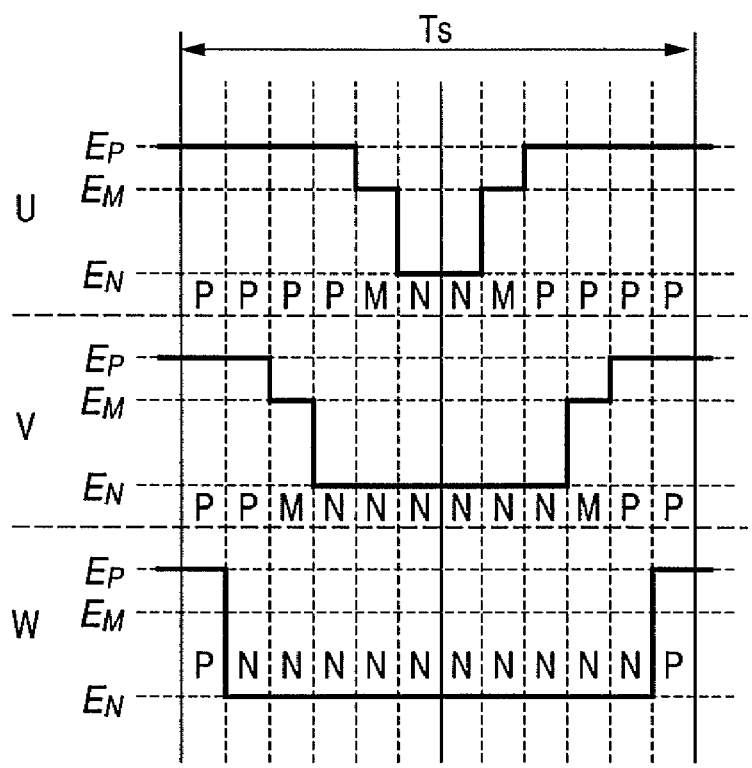

While either Op or On is utilized in the examples shown in FIGS. 2 and 3, it is also possible to set a PWM pulse which utilizes both Op and On, for example, carries out a uniform distribution as shown in FIG. 5. Since the number of switching operations is smaller in FIGS. 2 and 3, however, the examples are more advantageous in respect of a switching loss.

Second Example

In the case in which an output voltage command is in the vicinity of an angle formed with an a vector or a b vector, a PWM pulse is narrowed. In a direct power converter, the angles of the a vector and the b vector are not varied. In the case in which the phase of the output voltage command has an angle which is close to the a vector or the b vector, therefore, it is possible to maintain a PWM pulse width without monitoring the PWM pulse width by generating a switching signal to carry out a switching into a three-phase modulation in the control calculating apparatus of FIG. 1. Since a range of the angle to be switched depends on a commutating sequence method and a characteristic of a switching device, it is set corresponding thereto.

Third Example

Also in the case in which there is no problem in that a PWM pulse width is reduced when a switching is carried out depending on a phase of an output voltage command, the switch is performed so that a switching loss is increased. A change in the PWM pulse of FIG. 9 and the PWM pulse of FIG. 10 depends on a voltage state of an input power supply. Therefore, a condition for reducing the PWM pulse width is predicted from the voltage of the input power supply and the phase of the output voltage command. For example, only in the case in which the phase of the output voltage command is close to the angle of the b vector in FIG. 9, it is possible to reduce the switching loss by carrying out a switching from a two-phase modulation into a three-phase modulation. Since the range of the angle to be switched depends on a commutating sequence method and a characteristic of a switching device, it is set corresponding thereto.

Fourth Example

Figure 4:
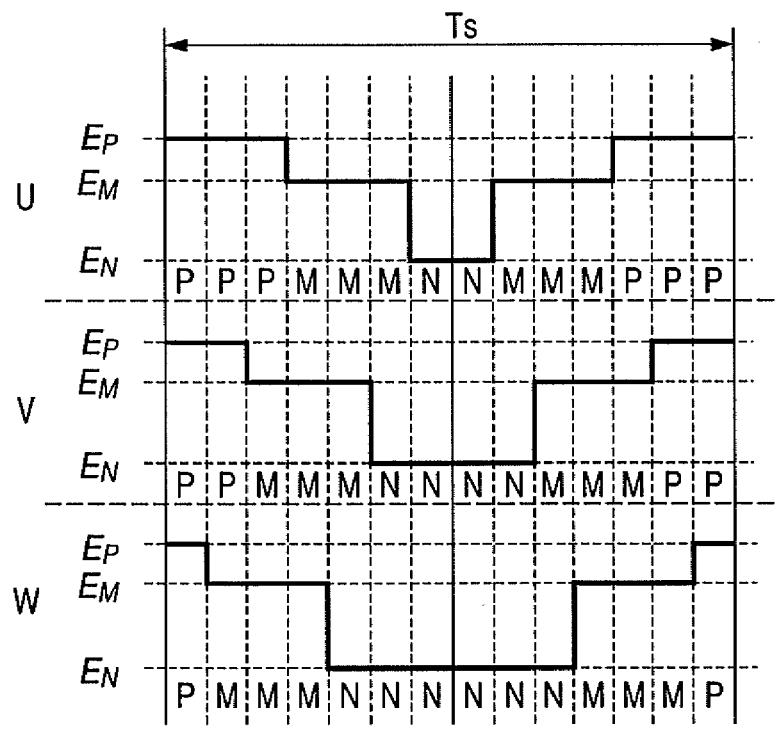
FIG. 4 is a diagram showing an example of switching the PWM pulse pattern of the power converter according to the present invention.

When an output voltage is low, both an a vector component and a b vector component in a PWM pulse are reduced. In the case in which an output voltage command is low, therefore, a PWM pulse width is maintained as a PWM pulse using both Op and On as shown in FIG. 5 or a PWM pulse shown in the example of FIG. 4. Since the PWM pulses in FIGS. 2 and 3 have portions in which the pulse width is reduced, they cannot be utilized when the output voltage is low. In the example of FIG. 4, the PWM pulse is not directly switched from P to N or N to P. Therefore, a switching loss per switching is lessened and a noise and a surge voltage can also be reduced. Moreover, a zero vector to be (M, M, M) in FIG. 4 may be omitted if a voltage error or a surge which is caused by simultaneous switching of two phases can be permitted.

Figure 11:
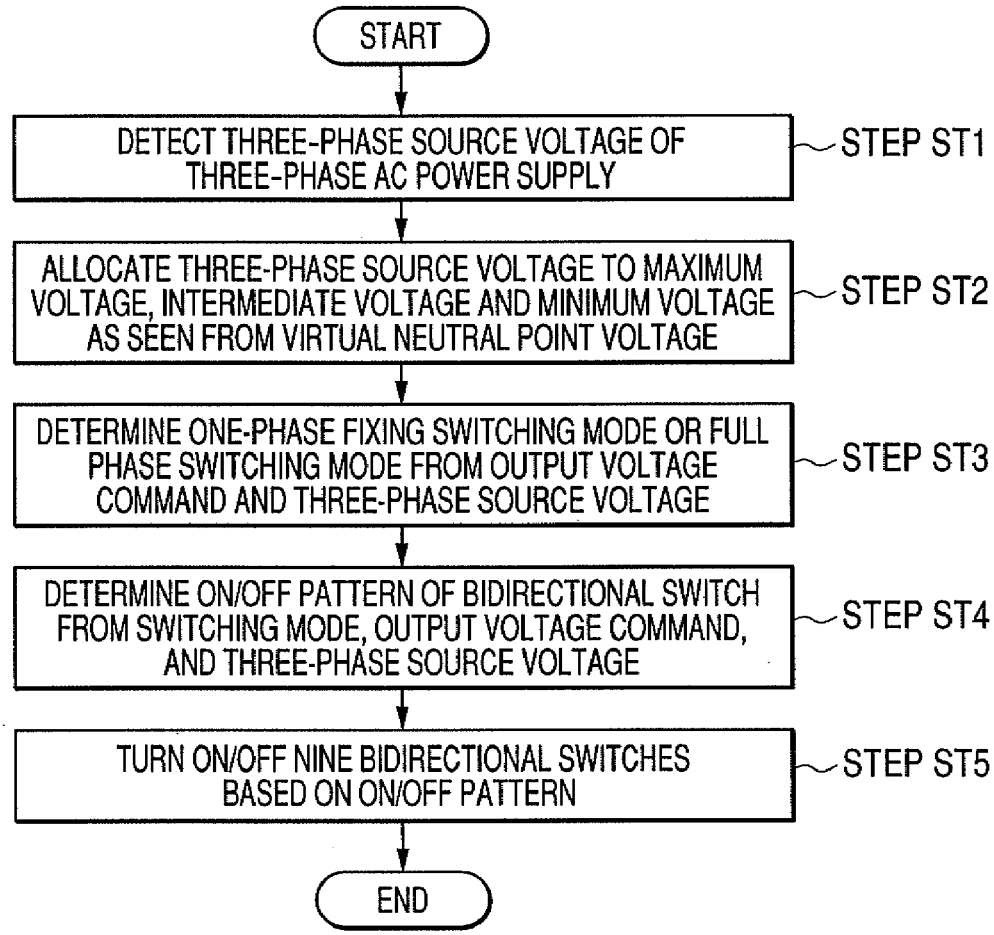
FIG. 11 is a flowchart showing a power conversion method according to the present invention.

FIG. 11 is a flowchart showing a power conversion method according to the present invention, which is executed every control sampling cycle. In FIG. 11, a three-phase source voltage of a three-phase AC power supply is detected at Step ST1. At Step ST2, next the three-phase source voltage is allocated to a maximum voltage, a minimum voltage and an intermediate voltage seen from a virtual neutral point. At Step ST3, subsequently, a one-phase switching mode or a full phase switching mode is determined from the output voltage command and the three-phase source voltage. At Step ST4, then, an ON/OFF pattern of a bidirectional switch is determined from the switching mode, the output voltage command and the three-phase source voltage. At Step ST5, thereafter, the bidirectional switch is turned ON/OFF based on the ON/OFF pattern.

Fifth Example

Referring to a three-phase source voltage and a phase, an allocation is carried out by setting a maximum voltage phase, a minimum voltage phase and an intermediate voltage phase seen from a neutral point to be P, N and M as shown in FIG. 6, respectively. An assignment of R, S and T and P, M and N in the case in which the highest point of an R-phase voltage to be an input power supply phase is set to be a reference ($\theta i=0$) is shown as a correspondence through source voltage phases of P, M and N and R, S and T in Table 1.

TABLE 1

| Voltage phase $\theta i$ [deg] | P phase | M phase | N phase |
|---|---|---|---|
| 0 to 60 | R | S | T |
| 60 to 120 | S | R | T |
| 120 to 180 | S | T | R |
| 180 to 240 | T | S | R |
| 240 to 300 | T | R | S |
| 300 to 360 | R | T | S |

In the case in which a virtual DC voltage is thus defined, it is possible to express a voltage vector which can be output from a direct power converting circuit as shown in FIG. 7. The direct power converting circuit can output a vector of $27=3^3$ as shown, and the vectors can be classified as a zero vector (op, om, on), a forward vector of a phase (a, ap, an), a reverse vector to the phase (b, bp, bn) and an intermediate vector (cm).

Figure 13:
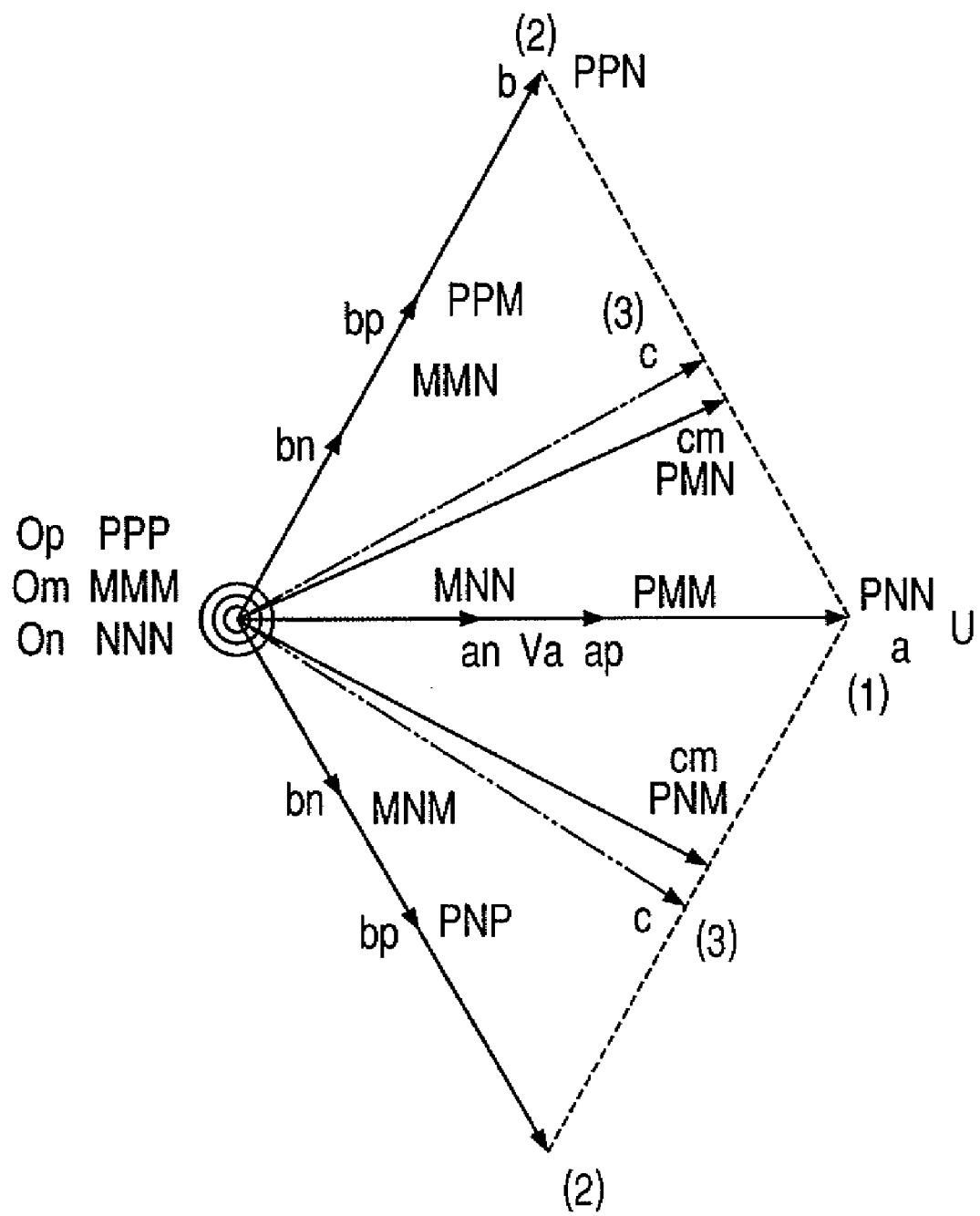
FIG. 13 is a diagram showing a change in a space vector diagram corresponding to a fluctuation in an input power phase.

A length of each vector excluding the zero vector is varied depending on a phase state of an input voltage, and a cm vector is further moved over a line connecting tips of an a vector and a b vector which are adjacent to each other (a dotted line in FIG. 7). In the diagram, an a vector component of a cm vector is equivalent to an ap vector, and a b vector component is equivalent to a bn vector. The vector is moved as shown in FIG. 13 and is coincident with another vector on the following conditions.

(1) If an electric potential of an input phase corresponding to M is equal to that of an input phase corresponding to N, N=M is obtained. Therefore, cm(PMN)=a(PNN)=ap(PMM) is set. (In this case, an=bn=on is set.)
(2) If the electric potential of the input phase corresponding to M is equal to that of an input phase corresponding to P, P=M is obtained. Therefore, cm(PMN)=b(PPN)=bn(MMN) is set, (In this case, ap=bp=op is set.)
(3) If the electric potential of the input phase corresponding to M has an intermediate value between the electric potentials of the input phase corresponding to P and the input phase corresponding to N, it has an angle of 30° formed with respect to an a vector and a length of ($\sqrt{3}$)/2. (In this case, ap=an=a/2 and bp=bn=b/2 are set.)

In order to consider an order for an output vector of the matrix converter, it is general to put the following restrictions.
(I) It is assumed that switching can be freely carried out mutually between P and M and between M and N in switching of P, M and N and a direct transition cannot be carried out between P and N.
(II) It is assumed that two-phase simultaneous switching is not permitted in principle.

Furthermore, the direct power converting circuit where:
(III) input lines are not short-circuited.

(IV) output lines are not opened.

By the restrictions, it is possible to reduce a safety and distortions of an output voltage and an input current. In a space vector concept having the condition in FIG. 7, the restrictions have already been put. Therefore, it is not necessary to particularly take them into consideration.

A direct power converting circuit for motor driving controls an AC input current, thereby changing the input current into a sine wave and setting an input power factor to be one. The control of the input current is implemented by distributing a load current to an input terminal by a selection of an output voltage vector on the assumption that a load motor is a current source.

For example, in an A region of FIG. 7, a relationship between input phase currents $I_P$, $I_M$ and $I_N$ and output phase currents $I_{(U)}$, $I_{(V)}$ and $I_{(W)}$ in the case in which a vector constituting the region is output is expressed in a relationship (A region) between an output vector and an input phase current-output phase current in Table 2.

TABLE 2

| Vector | P-phase current ($I_P$) | M-phase current ($I_M$) | N-phase current ($I_N$) |
| --- | --- | --- | --- |
| op (PPP), om (MMM), on (NNN) | 0 | 0 | 0 |
| ap (PMM) | $I_{(U)}$ | $I_{(V)} + I_{(W)}$ | 0 |
| an (MNN) | 0 | $I_{(U)}$ | $I_{(V)} + I_{(W)}$ |
| bp (PPM) | $I_{(U)} + I_{(V)}$ | $I_{(W)}$ | 0 |
| bn (MMN) | 0 | $I_{(U)} + I_{(V)}$ | $I_{(W)}$ |
| cm (PMN) | $I_{(U)}$ | $I_{(V)}$ | $I_{(W)}$ |
| a (PNN) | $I_{(U)}$ | 0 | $I_{(V)} + I_{(W)}$ |
| b (PPN) | $I_{(U)} + I_{(V)}$ | 0 | $I_{(W)}$ |

A P-phase current $I_P$, an M-phase current $I_M$ and an N-phase current $I_N$ can correspond to an actual input voltage phase (R, S, T) as shown in FIG. 6.

a, ap and an vectors and b, bp and bn vectors have the same direct on, and a cm vector can also be output in combination of the a and b vectors, and a combination of PWM pulses has a redundancy. Therefore, the input current can be controlled based on a combination selection of the output vector and the correspondence in FIG. 2. By developing the Table 2 into each region, it is possible to obtain a relationship between the output vector and the input phase current-output phase current in Table 3. Variables P1, P2 and P3 are changed in the same manner as a correspondence of P1, P2 and P3 to U, V and W phases in Table 4 depending on the region.

TABLE 3

| Vector | P-phase current ($I_P$) | M-phase current ($I_M$) | N-phase current ($I_N$) |
| --- | --- | --- | --- |
| op | 0 | 0 | 0 |
| om | | | |
| on | | | |
| Ap | $I_{(P1)}$ | $I_{(P2)} + I_{(P3)}$ | 0 |
| An | 0 | $I_{(P1)}$ | $I_{(P2)} + I_{(P3)}$ |
| Bp | $I_{(P1)} + I_{(P2)}$ | $I_{(P3)}$ | 0 |
| Bn | 0 | $I_{(P1)} + I_{(P2)}$ | $I_{(P3)}$ |
| Cm | $I_{(P1)}$ | $I_{(P2)}$ | $I_{(P3)}$ |
| A | $I_{(P1)}$ | 0 | $I_{(P2)} + I_{(P3)}$ |
| B | $I_{(P1)} + I_{(P2)}$ | 0 | $I_{(P3)}$ |

TABLE 4

| Region | P1 | P2 | P3 |
| --- | --- | --- | --- |
| A | U | V | W |
| B | V | U | W |
| C | V | W | U |
| D | W | V | U |
| E | W | U | V |
| F | U | W | V |

Next, description will be given to a relationship between an input current control and a PWM pulse pattern. First of all, the P-phase voltage, the M-phase voltage and the N-phase voltage in FIG. 6 are represented as $E_P$, $E_M$ and $E_N$ respectively, and the maximum value $dE_{max}$ in an input line voltage, an intermediate value $dE_{mid}$ and a minimum value $dE_{min}$ are defined in the following equations.

$$dE_{max} = E_P - E_N \tag{1}$$

$$dE_{mid} = E_P - E_M \text{ if } E_{base} = E_P \tag{2}$$
$$= E_M - E_N \text{ if } E_{base} = E_N$$

$$dE_{min} = E_M - E_N \text{ if } E_{base} = E_P \tag{3}$$
$$= E_P - E_M \text{ if } E_{base} = E_N$$

$E_{base}$ is a phase in which an absolute value of a phase voltage is a maximum, and has a correspondence shown in FIG. 6.

A change in $E_{base}$ based on $\theta_i$ is expressed as a relationship between $E_{base}$ and $E_P$, $E_M$ and $E_N$ in Table 5.

TABLE 5

| $\theta i$ [deg] | 0 to 30 | 30 to 90 | 90 to 150 | 150 to 210 | 210 to 270 | 270 to 330 | 330 to 360 |
| --- | --- | --- | --- | --- | --- | --- | --- |
| $E_{base}$ | $E_P$ | $E_N$ | $E_P$ | $E_N$ | $E_P$ | $E_N$ | $E_P$ |

A correspondence of $dE_{max}$, $dE_{mid}$ and $dE_{min}$ to a length of a space vector is as follows:

$$dE_{max} = |\vec{a}| = |\vec{b}| = Rr \cdot |\vec{cm}| \tag{4}$$

$$dE_{mid} = \begin{cases} |\vec{ap}| = |\vec{bp}| & \text{if } E_{base} = E_P \\ |\vec{an}| = |\vec{bn}| & \text{if } E_{base} = E_N \end{cases} \tag{5}$$

$$dE_{min} = \begin{cases} |\vec{an}| = |\vec{bn}| & \text{if } E_{base} = E_P \\ |\vec{ap}| = |\vec{bp}| & \text{if } E_{base} = E_N \end{cases} \tag{6}$$

Rr depends on $\theta_i$ and takes a value of 1 to $2/\sqrt{3}$.

If a voltage command Vo of an output voltage is represented as $(\theta, k)$ in polar coordinates, a relationship between an output voltage command vector and a space vector diagram shown in FIG. 8 is obtained. $\theta$ represents an angle formed with an U-phase a vector, and an angle formed with an adjacent a vector to the output voltage command is represented as $\theta'$.

An a vector direction component $V_a$ and a b vector direction component $V_b$ in the output voltage command vector $Vo(\theta, k)$ can be calculated in the following equation.

$$V_a = k \cdot \sin(\pi/3 - \theta') \tag{7}$$

$$V_b = k \cdot \sin(\theta') \tag{8}$$

Figure 21:
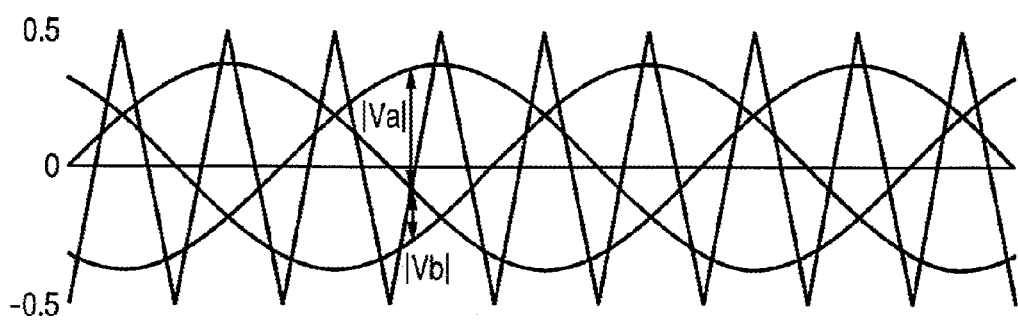
FIG. 21 is a diagram showing a relationship between a three-phase instantaneous voltage command and a vector component.

A correspondence of the lengths $V_a$ and $V_b$ to a three-phase output voltage command can be expressed in FIG. 21 as in a generating method for a three-phase modulation PWM of a 2-level inverter FIG. 21 shows an example in which an amplitude of a carrier is set to be 0.5 and the three-phase output voltage command is normalized.

$$|V_a|=V_{max}-V_{mid} \quad (9)$$

$$|V_b|=V_{mid}-V_{min} \quad (10)$$

wherein a maximum value, an intermediate value and a minimum value of an output phase voltage are represented as $V_{max}$, $V_{mid}$ and $V_{min}$, respectively.

$V_a$ and $V_b$ may be calculated by using the equations.

Moreover, a maximum value $dV_{max}$ and an intermediate value $dV_{mid}$ in an output line voltage are obtained in the following equations:

$$dV_{max} = V_{max} - V_{min} = |V_a| + |V_b| \quad (11)$$

$$dV_{mid} = V_{max} - V_{mid} = |V_a| \quad \text{if } \theta^* \le 30° \quad (12)$$
$$= V_{mid} - V_{min} = |V_b| \quad \text{if } \theta^* > 30°$$

In the case in which the output voltage command vector is output in a vector constituting a region, an output time per unit time of each vector is defined as follows.

$T_a$: output time of a vector
$T_b$: output time of b vector
$T_{cm}$: output time of cm vector
$T_{ap}$: output time of ap vector
$T_{an}$: output time of an vector
$T_{bp}$: output time of bp vector
$T_{bn}$: output time of bn vector
$T_{op}$: output time of op vector
$T_{om}$: output time of om vector
$T_{on}$: output time of on vector $V_a$ is synthesized with the a vector components of the respective vectors and $V_b$ is synthesized with the b vector components of the respective vectors. Therefore, $|V_a|$ and $|V_b|$ can be calculated in the following equations:

$$|V_a|=|a|\cdot T_a+|ap|\cdot T_{ap}+|an|\cdot T_{an}+|ap|\cdot T_{cm} \quad (13)$$

$$|V_b|=|b|\cdot T_b+|bp|\cdot T_{bp}+|bn|\cdot T_{bn}+|bn|\cdot T_{cm} \quad (14)$$

Furthermore, the input current of the direct power converting circuit can be calculated in the following equations based on the Table 3.

$$I_P=I_{(P1)}\cdot(T_{ap}+T_{bp}+T_{cm}+T_a+T_b)+I_{(P2)}\cdot(T_b+T_{bp}) \quad (15)$$

$$I_M=I_{(P1)}\cdot(T_{an}+T_{bn})+I_{(P2)}\cdot(T_{ap}+T_{bn}+T_{cm})+I_{(P3)}\cdot(T_{ap}+T_{bp}) \quad (16)$$

$$I_N=I_{(P2)}\cdot(T_{an}+T_a)+I_{(P3)}\cdot(T_{an}+T_{bn}+T_{cm}+T_a+T_b) \quad (17)$$

(Where, since both an input and an output have three-phase alternating currents balanced, $I_{(P1)}+I_{(P2)}+I_{(P3)}=0$ and $I_P+I_M+I_N=0$ are set.)

In the case in which an input current is set to be a sine wave to control an input power factor about 1, $I_P>I_M>I_N$ is obtained and a distribution factor $\alpha$ of the input current is defined as follows.

$$\alpha_{ic} = I_M / I_N \text{ if } E_{base} = E_P \quad (18)$$
$$= I_M / I_P \text{ if } E_{base} = E_N$$

When $\alpha_{ic}$ is thus defined, it takes a value of 0 to 1 because the input current is three-phase balanced.

Figure 14A:
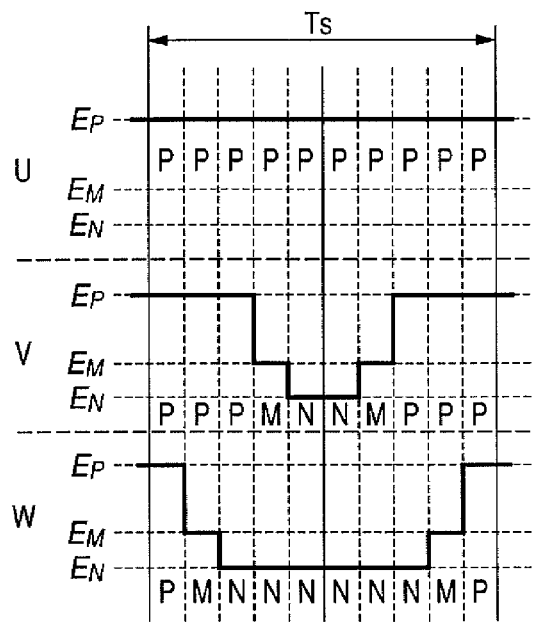
FIGS. 14A to 14D are diagrams showing an example of a pulse train to be output.
Figure 14B:
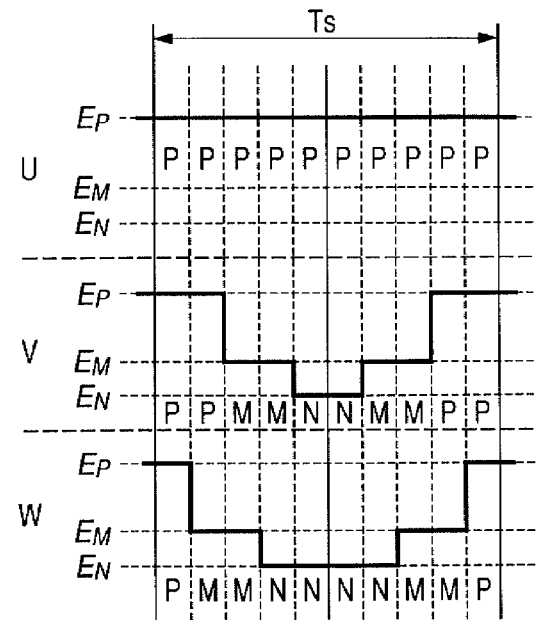

In a two-phase modulation PWM of the direct power converting circuit, only $dE_{max}$ and $dE_{mid}$ are used and a phase voltage of $dE_{min}$ is not output. Therefore, there is carried out a control which does not use any of the vectors ap, an, bp and bn which is shorter. The PWM pulse pattern and the output time of the vector are as follows (1) The Case of $E_{base}=E_p$ From the Equation (5), $dE_{mid}=|ap|=|bp|$ is set. Therefore, the output times of the an and bn vectors taking the value of $dE_{mid}$ are set to be zero $T_{an}=T_{bn}=0$. In this case, in consideration of an example of a pulse order in a PWM half cycle, op-bp-b-cm-a and op-bp-ap-cm-a are obtained so that pulses shown in FIGS. 14A and 14B are set.

P1, P2 and P3 are switched into the phases of U, V and W as shown in the Table 4 depending on a region in which an output voltage command vector is present.

From the Equations (13) and (14), a relationship between the output voltage and the output time of the vector is expressed in Equations (19) and (20).

$$|V_a|=dE_{max}\cdot T_a+dE_{mid}\cdot(T_{ap}+T_{cm}) \quad (19)$$

$$|V_b|=dE_{max}\cdot T_b+dE_{mid}\cdot T_{bp}+dE_{mid}\cdot T_{cm} \quad (20)$$

From the Equations (15), (16) and (17), a relationship between the input current and the output time of the vector is expressed in Equations (21), (22) and (23).

$$I_P=I_{(P1)}\cdot(T_{ap}+T_{bp}+T_{cm}+T_a+T_b)+I_{(P2)}\cdot(T_b+T_{bp}) \quad (21)$$

$$I_M=I_{(P2)}\cdot(T_{ap}+T_{cm})+I_{(P3)}\cdot(T_{ap}+T_{bp}) \quad (22)$$

$$I_N=I_{(P2)}\cdot(T_a)+I_{(P3)}\cdot(T_{cm}+T_a+T_b) \quad (23)$$

A distribution factor of the input current is $\alpha_{ic}=I_M/I_N$. In consideration of a ratio of terms of $I_{(P2)}$ and $I_{(P3)}$, therefore, a relationship between $\alpha_{ic}$ and the output time is obtained as follows.

$$\alpha_{ic} = \frac{T_{ap} + T_{cm}}{T_a} = \frac{T_{ap} + T_{bp}}{T_{cm} + T_a + T_b} \quad (24)$$

From Equation (19), accordingly, the following Equations are obtained.

$$T_a=|V_a|/(dE_{max}+dE_{mid}\cdot\alpha_{ic}) \quad (25)$$

$$T_{cm}=\alpha_{ic}\cdot T_a-T_{ap} \quad (26)$$

Moreover, the following Equations are obtained.

$$|V_a| + |V_b| = dE_{max}\cdot(T_a + T_b) + dE_{mid}\cdot \quad (27)$$
$$(T_{ap} + T_{bp} + T_{cm}) + dE_{min}\cdot T_{cm}$$
$$= dE_{max}\cdot(T_a + T_b) + dE_{mid}\cdot(T_{ap} + T_{bp}) +$$
$$(dE_{min} + dE_{min})\cdot T_{cm}$$
$$= dE_{max}\cdot(T_a + T_b + T_{cm}) + dE_{mid}\cdot(T_{ap} + T_{bp})$$

$$(T_a + T_b + T_{cm}) = (|V_a| + |V_b|)/(dE_{max} + dE_{mid}\cdot\alpha_{ic}) \quad (28)$$

Therefore, the output times of the other vectors can be calculated in the following Equation.

$$T_b = (|V_a| + |V_b|)/(dE_{max} + dE_{mid} \cdot \alpha_{ic}) - T_a - T_{cm} \quad (29)$$
$$= |V_b|/(dE_{max} + dE_{mid} \cdot \alpha_{ic}) - T_{cm}$$
$$= (|V_b| - \alpha_{ic}|V_a|)/(dE_{max} + dE_{mid} \cdot \alpha_{ic}) + T_{ap}$$

Accordingly, the following Equation is obtained.

$$T_b - T_{ap} = (|V_b| - \alpha_{ic}|V_a|)/(dE_{max} + dE_{mid} \cdot \alpha_{ic}) \quad (30)$$

Because of $T_b \geq 0$ and $T_{ap} \geq 0$, $T_{ap}=0$ is set to calculate $T_b$ and to output the PWM pulse pattern in FIG. 14A if $(|V_b|-\alpha_{ic}|V_a|) \geq 0$ is set, and $T_b=0$ is set to calculate $T_{ap}$ and to output the PWM pulse pattern in FIG. 14B if $(|V_b|-\alpha_{ic}|V_a|) < 0$ is set.

For Tap=0

$$T_b = (|V_b| - \alpha_{ic}|V_a|)/(dE_{max} + dE_{mid} \cdot \alpha_{ic}) \quad (31)$$

$$T_{cm} = \alpha_{ic} \cdot T_a = \alpha_{ic} \cdot |V_a|/(dE_{max} + dE_{mid} \cdot \alpha_{ic}) \quad (32)$$

$$T_{bp} = \alpha_{ic} \cdot (|V_a| + |V_b|)/(dE_{max} + dE_{mid} \cdot \alpha_{ic}) \quad (33)$$

For $T_b = 0$ $$T_{ap} = (\alpha_{ic}|V_a| - |V_b|)/(dE_{max} + dE_{mid} \cdot \alpha_{ic}) \quad (34)$$

$$T_{cm} = |V_b|/(dE_{max} + dE_{mid} \cdot \alpha_{ic}) \quad (35)$$

$$T_{bp} = (1 + \alpha_{ic}) \cdot |V_b|/(dE_{max} + dE_{mid} \cdot \alpha_{ic}) \quad (36)$$

$$T_{op} = 1 - (T_{ap} + T_{bp} + T_b + T_{cm} + T_a) \quad (37)$$

$$T_{an} = T_{bn} = 0 \quad (38)$$

(2) The Case of $E_{base} = E_n$

Figure 14C:
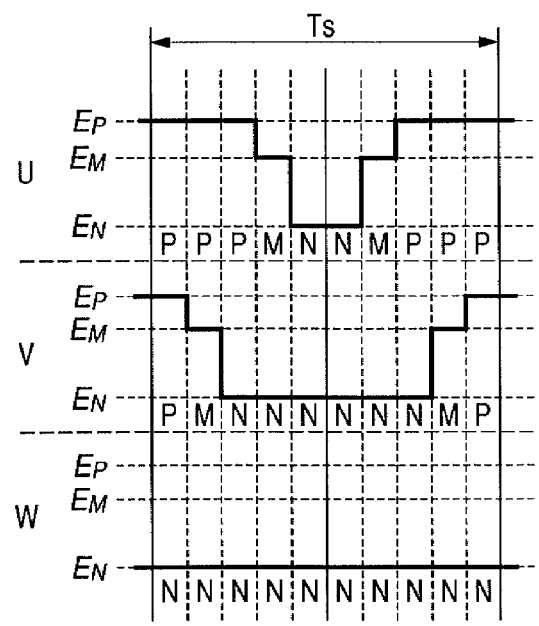
Figure 14D:
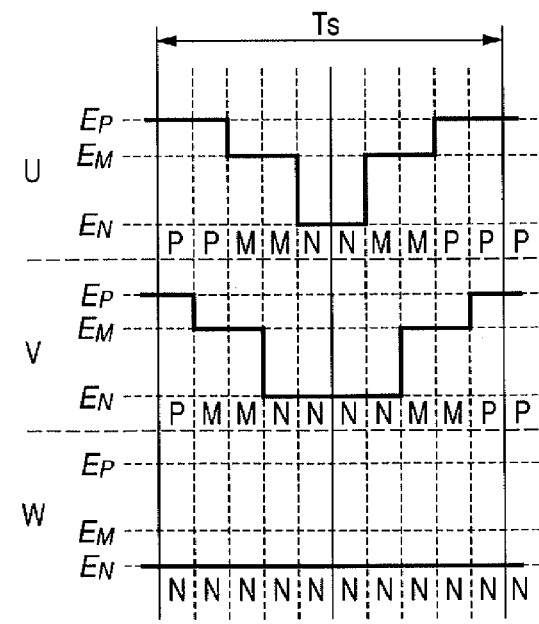
Figure 15A:
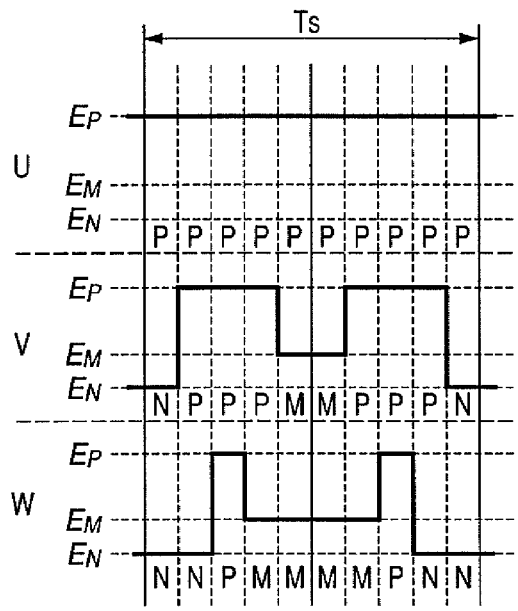
FIGS. 15A to 15D are diagram showing an example of the pulse train to be output.
Figure 15B:
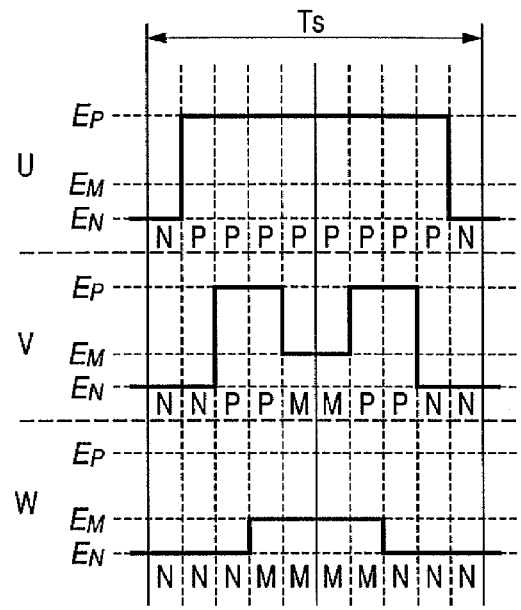
Figure 15C:
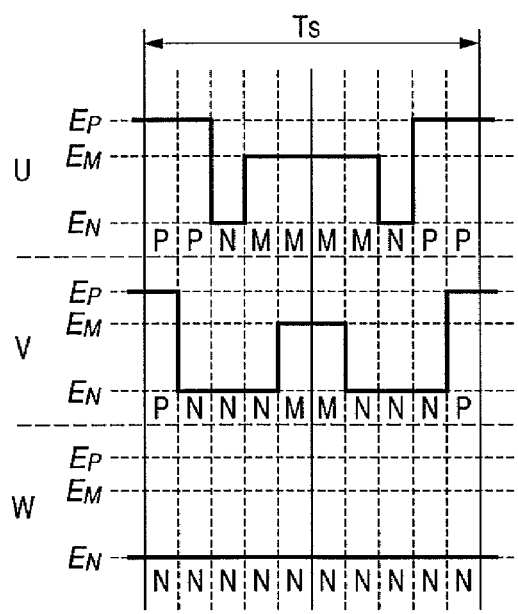
Figure 15D:
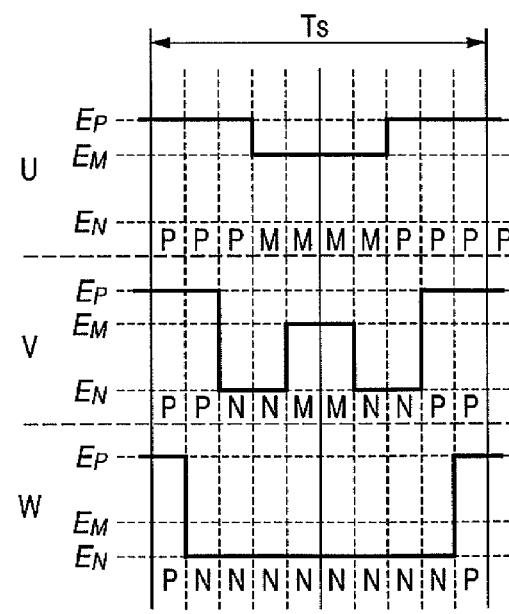

From the Equation (5), $dE_{mid} = |an| = |bn|$ is set. Therefore, the output times of the ap and bp vectors taking the value of $dE_{min}$ are set to be zero $T_{ap} = T_{bp} = 0$. In this case, in consideration of a pulse order, b-cm-a-an-on and b-cm-bn-an-on are obtained so that pulses shown in FIGS. 14C and 14D are set.

P1, P2 and P3 are switched into the phases of U, V and W as shown in the Table 4 depending on a region in which the output voltage command vector is present.

From the Equations (13) and (14), a relationship between the output voltage and the output time of the vector is expressed as follows.

$$|V_a| = dE_{max} \cdot T_a + dE_{mid} \cdot T_{an} + dE_{mid} \cdot T_{cm} \quad (39)$$

$$|V_b| = dE_{max} \cdot T_b + dE_{mid} \cdot (T_{bn} + T_{cm}) \quad (40)$$

From the Equations (15), (16) and (17), a relationship between the input current and the output time of the vector is expressed in Equations (41), (42) and (43).

$$I_P = I_{(P1)} \cdot (T_{cm} + T_a + T_b) + I_{(P2)} \cdot (T_b) \quad (41)$$

$$I_M = I_{(P1)} \cdot (T_{an} + T_{bn}) + I_{(P2)} \cdot (T_{bn} + T_{cm}) \quad (42)$$

$$I_N = I_{(P2)} \cdot (T_{an} + T_a) + I_{(P3)} \cdot (T_{an} + T_{bn} + T_{cm} + T_a + T_b) \quad (43)$$

A distribution factor of the input current is $\alpha_{ic} = I_M/I_P$. In consideration of a ratio of terms of $I_{(P1)}$ and $I_{(P2)}$, a relationship between $\alpha_{ic}$ and the output time is expressed in Equation (44).

$$\alpha_{ic} = \frac{T_{an} + T_{bn}}{T_{cm} + T_a + T_b} = \frac{T_{bn} + T_{cm}}{T_b} \quad (44)$$

From the Equation (40), accordingly, the following Equations are obtained.

$$T_b = |V_b|/(dE_{max} + dE_{mid} \cdot \alpha_{ic}) \quad (45)$$

$$T_{cm} = \alpha_{ic} \cdot T_b - T_{bn} \quad (46)$$

Moreover, the following Equations are obtained.

$$|V_a| + |V_b| = dE_{max} \cdot (T_a + T_b) + dE_{mid} \cdot (T_{an} + T_{bn} + T_{cm}) + \quad (47)$$
$$= dE_{min} \cdot T_{cm} dE_{max} \cdot (T_a + T_b) + dE_{mid} \cdot (T_{an} + T_{bn}) +$$
$$(dE_{min} + dE_{min}) \cdot T_{cm}$$
$$= dE_{min} \cdot (T_a + T_b + T_{cm}) + dE_{mid} \cdot (T_{an} + T_{bn})$$

$$(T_a + T_b + T_{cm}) = (|V_a| + |V_b|)/(dE_{max} + dE_{mid} \cdot \alpha_{ic}) \quad (48)$$

Therefore, the output times of the other vectors can be calculated in Equation (49).

$$T_a = (|V_a| + |V_b|)/(dE_{ma} \cdot x + dE_{mid} \cdot \alpha_{ic}) - T_b - T_{cm} \quad (49)$$
$$= |V_a|/(dE_{max} + dE_{mid} \cdot \alpha_{ic}) - T_{cm}$$
$$= (|V_a| - \alpha_{ic}|V_b|)/(dE_{max} + dE_{mid} \cdot \alpha_{ic}) + T_{bn}$$

Accordingly, the following Equation is obtained.

$$T_a - T_{bn} = (|V_a| - \alpha_{ic}|V_b|)/(dE_{max} + dE_{mid} \cdot \alpha_{ic}) \quad (50)$$

Because of $T_a \geq 0$ and $T_{an} \geq 0$, $T_{bn}=0$ is set to calculate $T_a$ and to output the PWM pulse pattern in FIG. 14C if $(|V_a|-\alpha_{ic}|V_b|) \geq 0$ is set and $T_a=0$ is set to calculate $T_{bn}$ and to output the PWM pulse pattern in FIG. 14D if $(|V_a|-\alpha_{ic}|V_b|) < 0$ is set.

For $T_{bn}=0$ $$T_a = (|V_a| - \alpha_{ic}|V_b|)/(dE_{max} + dE_{mid} \cdot \alpha_{ic}) \quad (51)$$

$$T_{cm} = \alpha_{ic} \cdot T_b \quad (52)$$

$$T_{an} = \alpha_{ic} \cdot (|V_a| + |V_b|)/(dE_{max} + dE_{mid} \cdot \alpha_{ic}) \quad (53)$$

For $T_a = 0$ $$T_{bn} = (\alpha_{ic}|V_b| - |V_a|)/(dE_{max} + dE_{mid} \cdot \alpha_{ic}) \quad (54)$$

$$T_{cm} = |V_a|/(dE_{max} + dE_{mid} \cdot \alpha_{ic}) \quad (55)$$

$$T_{an} = (1 + \alpha_{ic}) \cdot |V_a|/(dE_{max} + dE_{mid} \cdot \alpha_{ic}) \quad (56)$$

$$T_{on} = 1 - (T_{an} + T_{bn} + T_b + T_{cm} + T_a) \quad (57)$$

$$T_{ap} = T_{bp} = 0 \quad (58)$$

Sixth Example

In the case in which an AC/DC converting circuit and a DC/AC converting circuit are separately treated in a direct power converting circuit only DC corresponding to two wirings can be sent to an output. In the space vector of FIG. 7, therefore, a cm vector having three values of P, M and N cannot be output. In this case, accordingly, it is possible to select whether the cm vector is used or not by setting a calculation which does not use the cm vector. An output time calculation for each vector in this case can be executed as follows.

The Case of $E_{base}=E_p$ $$I_M = I_{(P1)} \cdot (T_{an}+T_{bn}) + I_{(P2)} \cdot (T_{ap}+T_{bn}) + I_{(P3)} \cdot (T_{ap}+T_{bp}) \quad (59)$$

$$I_N = I_{(P2)} \cdot (T_{an}+T_a) + I_{(P3)} \cdot (T_{an}+T_{bn}+T_a+T_b) \quad (60)$$

From $I_{(P1)}=-(I_{(P2)}+I_{(P3)})$, $$I_M = I_{(P2)} \cdot (T_{ap}-T_{an}) + I_{(P3)} \cdot (T_{ap}+T_{bp}-T_{an}-T_{bn}) \quad (61)$$

$$\alpha_{ic} = \frac{T_{ap}-T_{an}}{T_{an}+T_a} = \frac{T_{ap}+T_{bp}-T_{an}-T_{bn}}{T_{an}+T_{bn}+T_a+T_b} \quad (62)$$

In the case of $E_{base}=E_p$, $|ap|=|bp|>|an|=|bn|$ is set. If $T_{an}=T_{bn}=0$ is set, therefore, the following equation is obtained.

$$\alpha_{ic} = \frac{T_{ap}}{T_a} = \frac{T_{ap}+T_{bp}}{T_a+T_b} \quad (63)$$

$$\alpha_{ic} = \frac{T_{ap}}{T_a} = \frac{T_{bp}}{T_b} \quad (64)$$

Consequently, it is possible to control an input power factor about 1.

From $T_{ap}=\alpha_{ic} \cdot T_a$ and $T_{bp}=\alpha_{ic} \cdot T_b$, $$|V_a|=|a| \cdot T_a+|ap| \cdot T_{ap}=(|a|+\alpha_{ic} \cdot |ap|) \cdot T_a \quad (65)$$

$$|V_b|=|b| \cdot T_b+|bp| \cdot T_{bp}=(|b|+\alpha_{ic} \cdot |bp|) \cdot T_b \quad (66)$$

$$T_a=|V_a|/(dE_{max}+\alpha_{ic} \cdot dE_{mid}) \quad (67)$$

$$T_b=|V_b|/(dE_{max}+\alpha_{ic} \cdot dE_{mid}) \quad (68)$$

In the case of $E_{base}=E_n$ $$I_P = I_{(P1)} \cdot (T_{ap}+T_{bp}+T_a+T_b) + I_{(P2)} \cdot (T_b+T_{bp}) \quad (69)$$

$$I_M = I_{(P1)} \cdot (T_{an}+T_{bn}) + I_{(P2)} \cdot (T_{ap}+T_{bn}) + I_{(P3)} \cdot (T_{ap}+T_{bp}) \quad (70)$$

From $I_{(P3)}=-(I_{(P1)}+I_{(P2)})$, $$I_M = I_{(P1)} \cdot (Tan+Tbn-Tap-Tbp) + I_{(P2)} \cdot (Tbn-Tbp) \quad (71)$$

$$\alpha_{ic} = \frac{T_{an}+T_{bn}-T_{ap}-T_{bp}}{T_{ap}+T_{bp}+T_a+T_b} = \frac{T_{bn}-T_{bp}}{T_b+T_{bp}} \quad (72)$$

In the case of $E_{base}=E_n$, $|an|=|bn|>|ap|=|bp|$ is set. If $T_{ap}=T_{bp}=0$ is set, therefore, the following equation is obtained.

$$\alpha_{ic} = \frac{T_{an}+T_{bn}}{T_a+T_b} = \frac{T_{bn}}{T_b} \quad (73)$$

$$\alpha_{ic} = \frac{T_{an}}{T_a} = \frac{T_{bn}}{T_b} \quad (74)$$

Consequently, it is possible to control an input power factor about 1. From $T_{an}=\alpha_{ic} \cdot T_a$ and $T_{bn}=\alpha_{ic} \cdot T_b$, $$|V_a|=|a| \cdot T_a+|an| \cdot T_{an}=(|a|+\alpha_{ic} \cdot |an|) \cdot T_a \quad (75)$$

$$|V_b|=|b| \cdot T_b+|bn| \cdot T_{bn}=(|b|+\alpha_{ic} \cdot |bn|) \cdot T_b \quad (76)$$

$$T_a=|V_a|/(dE_{max}+\alpha_{ic} \cdot dE_{mid}) \quad (77)$$

$$T_b=|V_b|/(dE_{max}+\alpha_{ic} \cdot dE_{mid}) \quad (78)$$

FIG. 15 shows an example of a pulse to be output in this case.

There will be considered a comparison between a pulse which uses a cm vector and a pulse which does not use the cm vector. In the case in which the cm vector is used, a change is small in the switching of the output voltage (switching between P and N is not generated). Therefore, the distortion of the output voltage is reduced. In the case in which a discontinuity is generated on the pulse of the input current (there are the $E_M$ phase in FIG. 14A and the $E_M$ phase in FIG. 14C), the distortion of the input current is increased.

In the case in which the cm vector is not used, the change in the switching of the output voltage is great (the switching between P and N is generated). Therefore, the distortion of the output voltage is increased. However, the discontinuity is not generated on the pulse of the input current so that the distortion of the input current is reduced.

Seventh Example

Thus, a difference is generated between the distortions of the input current and the output voltage depending on a pulse train which is output. By providing a PWM pulse pattern switching device for switching the pulses corresponding to a use situation, therefore, it is possible to select a power converter for attaching importance to quality of the input current (a system is rarely influenced adversely) or quality of the output voltage (an output noise is lessened). By utilizing a space vector, thus, it is possible to carry out a switching by simply changing a calculation algorithm and a PWM pulse pattern. Consequently, a complicated hardware is not required. Therefore, it is possible to inexpensively constitute the converting device. By employing such a structure as to decide the presence of the generation of the pulses in FIGS. 14A and 14C based on the phase of the input current and that of an instantaneous output voltage, thereby carrying out a switching to the pulse in FIGS. 15A to 15D during an operation which is slightly complicated, it is also possible to take a middle between the case of only FIGS. 14A to 15D and the case of only FIG. 16 which does not greatly deteriorate the distortions of the input current and the output voltage. Thus, it is possible to employ a power converter capable of selecting them and having a high versatility depending on the situations of a power supply and a load which are used.

Eighth Example

The PWM pulse pattern utilizes the two-phase modulation for stopping one-phase switching. In some cases in which an output voltage is low, therefore, a dead time or an ON time of a switching device is greatly shortened and a very low voltage is not generated. In the case in which the output voltage is low, it is possible to prolong a pulse time, thereby maintaining the output voltage by utilizing a short voltage vector. A method of calculating a pulse time in this case does not use long vectors a, b and cm. Therefore, with $|T_a|=|T_b|=|T_c|=0$, Equations (79) to (83) can be obtained as follows:

$$|V_a|=|ap|\cdot T_{ap}+|an|\cdot T_{an} \quad (79)$$

$$|V_b|=|bp|\cdot T_{bp}+|bn|\cdot T_{bn} \quad (80)$$

$$I_P=I_{(P1)}\cdot(T_{ap}+T_{bp})+I_{(P2)}\cdot(T_{bp}) \quad (81)$$

$$I_M=I_{(P1)}\cdot(T_{an}+T_{bn})+I_{(P2)}\cdot(T_{ap}+T_{bn})+I_{(P3)}\cdot(T_{ap}+T_{bp}) \quad (82)$$

$$I_N=I_{(P2)}\cdot(T_{an})+I_{(P3)}\cdot(T_{an}+T_{bn}) \quad (83)$$

(Where, since both an input and an output of three-phase alternating currents are balanced, $I_{(P1)}+I_{(P2)}+I_{(P3)}=0$ and $I_P+I_M+I_N=0$ are set.)

When a total output time of the ap and an vectors is represented as $T_{ax}$, a total output time of the bp and bn vectors is represented as $T_{bx}$, and each output ratio is represented as follows:

$$T_{ap}=\alpha 1\cdot T_{ax}, \; T_{an}=(1-\alpha 1)\cdot T_{ax} \quad (84)$$

$$T_{bp}=\alpha 2\cdot T_{bx}, \; T_{bn}=(1-\alpha 2)\cdot T_{bx} \quad (85)$$

Equations (79) to (83) are expressed as follows:

$$|V_a|=|ap|\cdot\alpha 1\cdot T_{ax}+|an|\cdot(1-\alpha 1)\cdot T_{ax} \quad (86)$$

$$|V_b|=|bp|\cdot\alpha 2\cdot T_{bx}+|bn|\cdot(1-\alpha 2)\cdot T_{bx} \quad (87)$$

$$I_P=I_{(P1)}\cdot\alpha 1\cdot T_{ax}-I_{(P3)}\cdot\alpha 2\cdot T_{bx} \quad (88)$$

$$I_M=I_{(P1)}\cdot(1-2\cdot\alpha 1)\cdot T_{ax}+I_{(P3)}\cdot(2\cdot\alpha 2-1)\cdot T_{bx} \quad (89)$$

$$I_N=-I_{(P1)}\cdot(1-\alpha 1)\cdot T_{ax}+I_{(P3)}\cdot(1-\alpha 2)\cdot T_{bx} \quad (90)$$

A distribution factor $\alpha_{ic}$ of an input current is defined for a control of an input power factor about 1 as follows:

$$\alpha_{ic}=\begin{cases} I_M/I_N & \text{if } E_{base}=E_P \\ I_M/I_P & \text{if } E_{base}=E_N \end{cases} \quad (91)$$

(1) In the case of $E_{base}=E_P$, $\alpha_{ic}=(1-2\cdot\alpha 1)/\alpha 1=(2\cdot\alpha 2-1)/(-\alpha 2)$ is set so that $\alpha 1=\alpha 2=1/(\alpha_{ic}+2)$ is obtained.

$\alpha_{ic}$ takes a value of 0 to 1, and then $\alpha 1=\alpha 2$ takes a value of ⅓ to ½.

(2) In the case of $E_{base}=E_N$, $\alpha_{ic}=(1-2\cdot\alpha 1)/(-(1-\alpha 1))=(2\cdot\alpha 2-1)/(1-\alpha 1)$ is set so that $\alpha 1=(1+\alpha ic)/(\alpha_{ic}+2)$ is obtained. $\alpha_{ic}$ takes a value of 0 to 1, and then $\alpha 1=\alpha 2$ takes a value of ½ to ⅔.

When a value of $\alpha 1=\alpha 2$ is determined, $T_{ax}$ and $T_{bx}$ are determined based on Equations (86) and (87) as follows:

$$T_{ax}=|V_a|/\{|ap|\cdot\alpha 1+|an|\cdot(1-\alpha 1)\} \quad (92)$$

$$T_{bx}=|V_b|/\{|bp|\cdot\alpha 2+|bn|\cdot(1-\alpha 2)\} \quad (93)$$

$T_{ap}$, $T_{an}$, $T_{bp}$ and $T_{bn}$ can be obtained by Equations (84) and (85).

Figure 16:
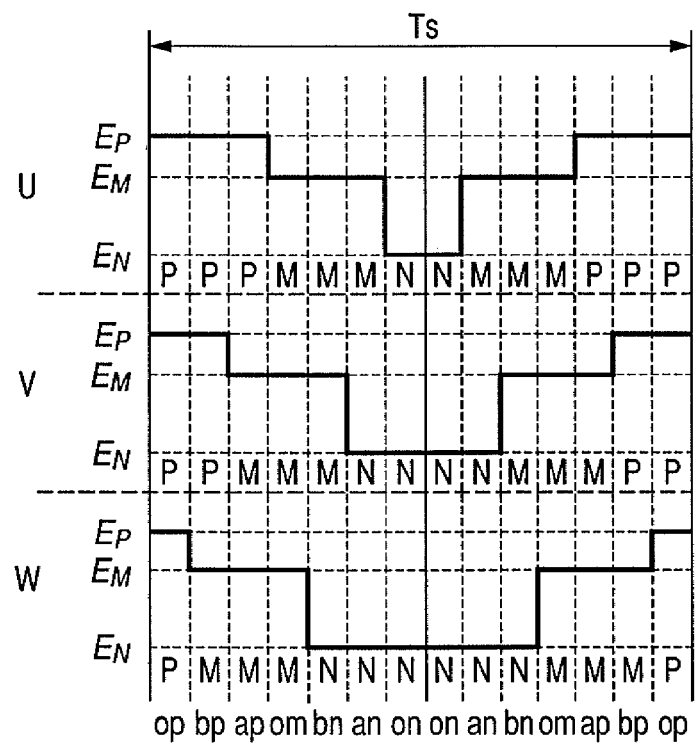
FIG. 16 is a diagram showing an example of the pulse train to be output.

If an example of a pulse having a three-phase modulation shown in FIG. 16 is output by the calculation, a low voltage can also be output reliably. In this case, however, a, b and cm vectors are not used. Therefore, a restriction is generated on a maximum voltage which can be output. An estimation is carried out in Equations (92) and (93).

In the case of $T_{ax}=1$ and $T_{bx}=0$, a minimum value of $|V_a|$ which can be output is expressed by $|ap|=dE_{max}-|an|$, $|an|$ is in a range of 0 to $dE_{max}$ and $\alpha 1$ takes a value of ⅓ to ⅔. Therefore, the following equation is obtained.

$$|V_a|=\{dE_{max}\cdot\alpha 1+|an|\cdot(1-2\cdot\alpha 2)\} \quad (94)$$

Figure 17:
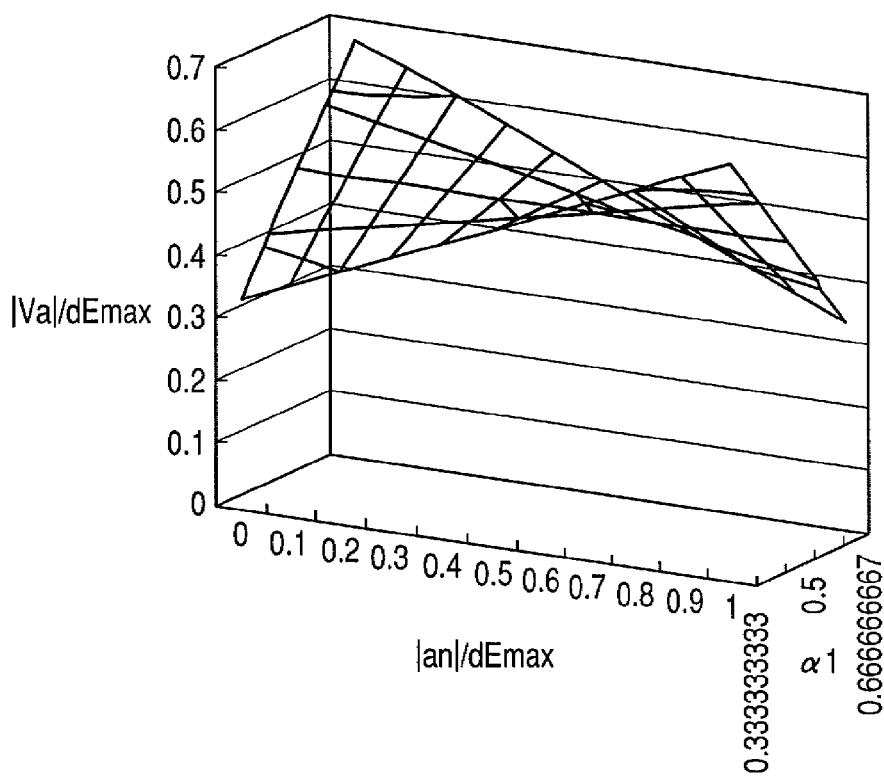
FIG. 17 is a diagram showing a change in a vector component of a voltage that can be output in the pulse train of FIG. 16.
Figure 18:
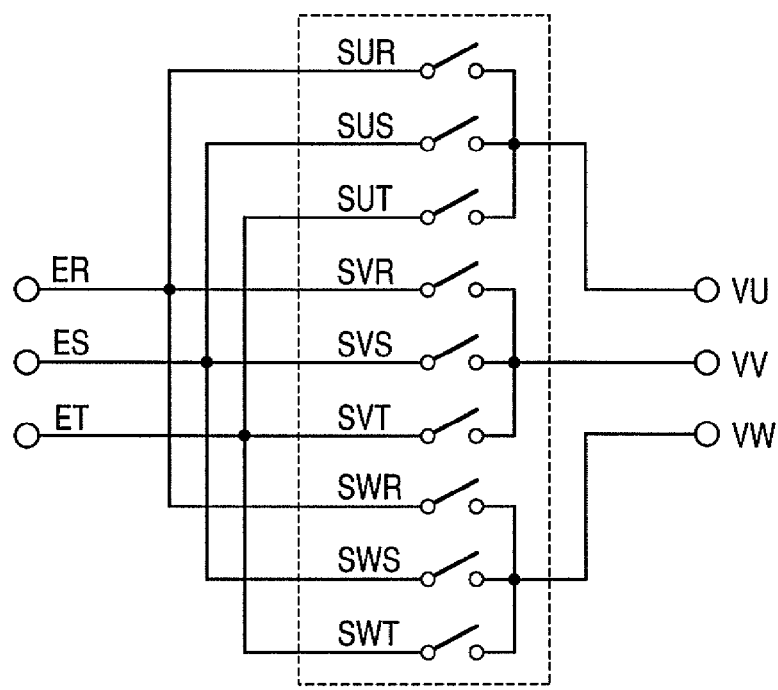
FIG. 18 is a diagram showing a circuit structure of a matrix converter.

This is changed into a graph as shown in FIG. 17, so that $|V_a|/dE_{max}$ takes a value of ⅓ to ⅔.

Also in the case of $T_{ax}=0$ and $T_{bx}=1$, the same consideration is taken, $|V_b|/dE_{max}$ takes a value of ⅓ to ⅔ on the condition of $\alpha_{ic}$. Accordingly, it is apparent that the distortion of the output voltage is increased if the output voltage is not equal to or smaller than ⅓ of $dE_{max}$ in the case in which the control of the input power factor is carried out in the modulation. In the invention, a pulse having a three-phase modulation and a pulse having a two-phase modulation are switched corresponding to a first set value in which a length of the output voltage vector takes a value of ⅓ of $dE_{max}$ or less. Consequently, it is possible to provide a power converter capable of smoothly lessening a distortion from a low voltage to a high voltage.

In the example of the pulse shown in FIG. 16, moreover, a change in switching of the output voltage is small (switching between P and N is not generated) and a discontinuity is not generated on the pulse of the input current. Therefore, it is possible to obtain a pulse having small distortions of an input current and an output voltage with the output voltage of ⅓ of $dE_{max}$ or less.

Ninth Example

It is also possible to determine an output time of an output voltage vector as in a direct torque control in place of a calculation. In that case, a transition of a pulse to be output depending on a vector state of an output voltage is selected to be a transition shown in the examples of FIGS. 14A to 16. By switching them, it is possible to obtain a power converter in which distortions of an input current and the output voltage are reduced.

Figure 20:
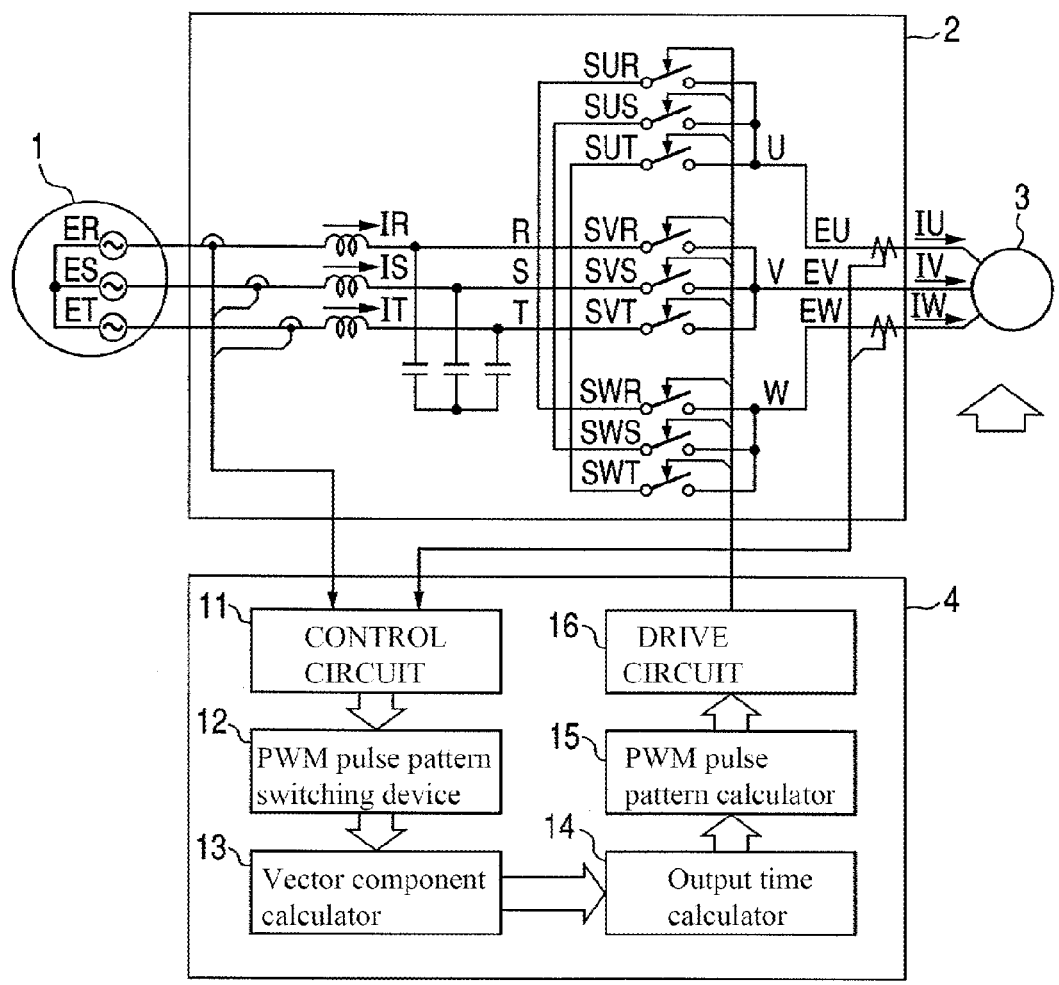
FIG. 20 is a block diagram showing a structure according to the present invention.

FIG. 20 is a block diagram showing a structure according to the present invention. In FIG. 20, 11 denotes a control circuit, 12 denotes a PWM pulse pattern switching device, 13 denotes a vector component calculator, 14 denotes an output time calculator, 15 denotes a PWM pulse pattern calculator, and 16 denotes a drive circuit. The control circuit 11 serves to generate a current command from a speed command and a speed signal of a motor which is a load and to generate a voltage command from the current command and a motor current signal, and furthermore, to classify each phase voltage of an AC power supply into a P phase having a maximum voltage value, an M phase having an intermediate voltage value and an N phase having a minimum voltage value. The PWM pulse switch device 12 serves to determine whether a cm vector is used or not depending on a phase relationship of a source voltage, thereby selecting a PWM pulse pattern. The vector component calculator 13 serves to cause a voltage vector determined by a connecting state of a phase on an output side to the AC power supply to correspond to a hexagonal space vector diagram, to select an equal voltage vector to an instantaneous voltage vector to be output from the hexagonal space vector diagram and to calculate a vector component of the instantaneous voltage vector. The output time calculator 14 serves to calculate an output time of a voltage vector from a voltage vector component. The PWM pulse pattern calculator 15 synthesizes the PWM pulse pattern from the output time of the vector component, thereby generating a gate signal. The drive circuit 16 serves to isolation amplify a gate signal, thereby driving a bidirectional switch.

INDUSTRIAL APPLICABILITY

According to the present invention, it is possible to decrease distortions of an output voltage and an output current and to simplify a switching, and to lessen a switching loss. Therefore, it is possible to implement an enhancement in a performance, a decrease in a cost and a reduction in a size of a control apparatus. Consequently, the invention can also be applied to uses such as motor driving and a power converter for converting a frequency and a voltage of a system power supply.

According to the present invention, furthermore, it is possible to easily calculate an output voltage vector time of a direct power converting circuit by utilizing a space vector and to implement an enhancement in a performance, a decrease in a cost and a reduction in a size of a power converter. Moreover, it is possible to carry out a selection and regulation through distortions of an input current and an output voltage. Therefore, it is possible to implement a power converter having a high reliability which can correspond to various situations of a power supply and a load. Consequently, the invention can also be applied to the uses such as the motor driving and the power converter for converting a frequency and a voltage of a system power supply.

Figure 19:
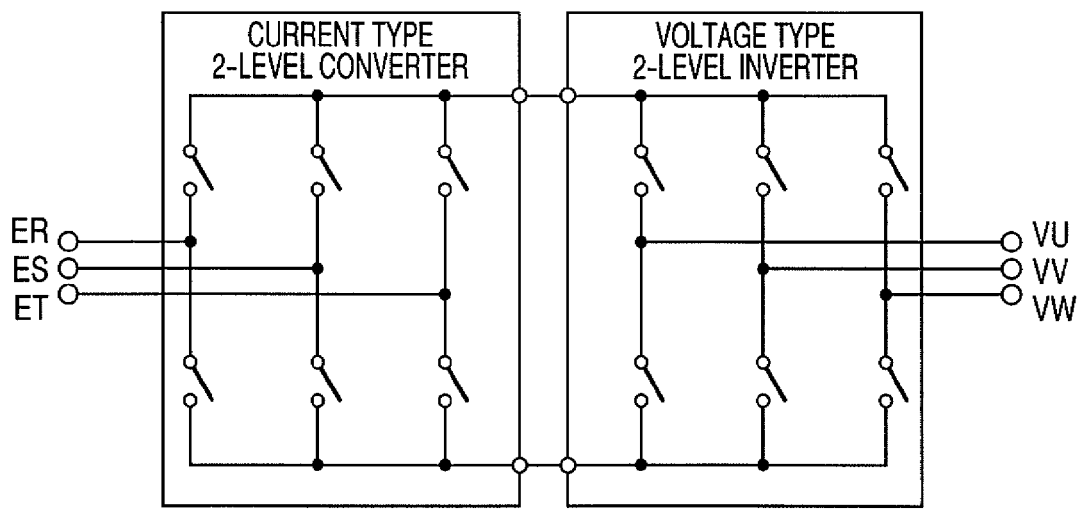
FIG. 19 is a diagram showing the circuit structure of the matrix converter.

FIG. 1
A. Drive circuit
B. Three-phase modulation PWM pulse generator
C. Two-phase modulation PWM pulse generator
D. Switching mode
E. Switching signal
F. Control calculation circuit FIG. 7
A. A region
B. B region
C. C region
D. D region
E. E region
F. F region FIG. 11
Step ST1 Detect three-phase source voltage of three-phase AC power supply
Step ST2 Allocate three-phase source voltage to maximum voltage, intermediate voltage and minimum voltage as seen from virtual neutral point voltage
Step ST3 Determine one-phase fixing switching mode or full phase switching mode from output voltage command and three-phase source voltage
Step ST4 Determine ON/OFF pattern of bidirectional switch from switching mode, output voltage command, and three-phase source voltage
Step ST5 Turn ON/OFF nine bidirectional switches based on ON/OFF pattern FIG. 12
A. Neutral point voltage
B. Virtual neutral point FIG. 19
A. Current type 2-level converter
B. Voltage type 2-level inverter

The invention claimed is:

1. A power converter for connecting each phase of an AC power supply to each phase on an output side through a bidirectional switch having a self-extinction capability, and controlling an ON/OFF state of the switch, thereby outputting any voltage, the power converter comprising:
 a vector component calculator that carries out a classification into a P phase having a maximum voltage value of the AC power supply, an M phase having an intermediate voltage value, and an N phase having a minimum voltage value based on a voltage value of each phase seen from a neutral point of the AC power supplies, and applies a voltage vector determined based on a connecting state of the phase on the output side and the AC power supply to a hexagonal space vector diagram, and selects a voltage vector equal to an instantaneous voltage vector to be output, from the hexagonal space vector diagram, and then calculates a vector component of the instantaneous voltage vector; and
 an output time calculator for calculating an output time of the voltage vector based on the vector component,
 wherein a switch of the power converter is ON/OFF controlled based on a calculation result of the time calculator.

2. The power converter according to claim 1, wherein the vector component calculator and the output time calculator repeat a calculation every certain cycle.

3. The power converter according to claim 1, wherein when a plurality of voltage vectors having the same vector component are present, they are sequentially selected every predetermined time and an input current of the AC power supply is converted into a sine wave.

4. The power converter according to claim 1, further comprising:
 a PWM pulse pattern switching device for switching between a PWM pulse pattern which outputs a cm vector obtained by electrically connecting each phase of a three-phase AC output to the P phase, the N phase and the M phase of a three-phase AC power supply and a PWM pulse pattern which does not output the cm vector.

5. The power converter according to claim 4, wherein the PWM pulse pattern switching device is operated based on a phase of an input current and a phase of an output voltage.

6. The power converter according to claim 1, wherein only PWM pulse patterns of ap, an, bp and bn vectors for connecting each phase of a three-phase AC output to any one of the M phase, the P phase and the N phase of a three-phase AC power supply and a zero vector are used.

7. The power converter according to claim 1, wherein only PWM pulse patterns of ap, an, bp and bn vectors for connecting each phase of a three-phase AC output to any one of the M phase, the P phase and the N phase of a three-phase AC power supply and a zero vector are used when an output voltage is equal to or smaller than a first set value taking a value of approximately ⅓ of a line voltage maximum value of an input power supply.

* * * * *